(12) United States Patent
Sasaki et al.

(10) Patent No.: US 7,182,522 B2
(45) Date of Patent: Feb. 27, 2007

(54) OPTICAL CONNECTION STRUCTURE AND OPTICAL CONNECTION METHOD

(75) Inventors: Kyoichi Sasaki, Shizuoka (JP); Masayoshi Suzuki, Fujieda (JP); Tatsushi Kobayashi, Shizuoka (JP); Kazufusa Noda, Tokyo (JP)

(73) Assignee: Tomoegawa Paper Co., Ltd., Tokyo (JP)

( * ) Notice: Subject to any disclaimer, the term of this patent is extended or adjusted under 35 U.S.C. 154(b) by 64 days.

(21) Appl. No.: 11/011,839

(22) Filed: Dec. 14, 2004

(65) Prior Publication Data

US 2005/0220420 A1 Oct. 6, 2005

(30) Foreign Application Priority Data

Dec. 16, 2003 (JP) .............................. 2003-418298

(51) Int. Cl.
*G02B 6/36* (2006.01)
(52) U.S. Cl. .......................................... 385/53; 385/55
(58) Field of Classification Search ..................... None
See application file for complete search history.

(56) References Cited

U.S. PATENT DOCUMENTS 6,540,409 B1* 4/2003 Yamada ........................ 385/59
6,550,977 B2* 4/2003 Hizuka ........................ 385/55
6,698,937 B2* 3/2004 Grimes et al. ................ 385/53

FOREIGN PATENT DOCUMENTS

| JP | 8-5869 | 1/1996 |
|---|---|---|
| JP | 8-240746 | 9/1996 |
| JP | 2000-139642 | 5/2000 |

\* cited by examiner

*Primary Examiner*—Sung Pak
*Assistant Examiner*—Mike Stahl
(74) *Attorney, Agent, or Firm*—Wood, Herron & Evans, L.L.P.

(57) ABSTRACT

An optical connection structure has an adapter which mounts two connection members mounting two optical fibers brought face to face with each other, a cam member which transports the connection members in an axial direction of the optical fiber, and an urging member which urges the optical fiber in the axial direction of the optical fiber in a state that the pair of optical fibers which are held respectively by the pair of connection members are brought face to face with each other.

23 Claims, 23 Drawing Sheets

OPTICAL CONNECTION STRUCTURE AND OPTICAL CONNECTION METHOD

BACKGROUND OF THE INVENTION

1. Field of the Invention

The present invention relates to an optical connection structure for connecting a plurality of optical functional components (occasionally called connection members below) such as optical fibers and the like, and to an optical connection method.

Priority is claimed on Japanese Patent Application No. 2003-418298, filed Dec. 16, 2003, the content of which is incorporated herein by reference.

2. Description of Related Art

In the optical fiber connector for single core connection, the connection parts such as F01 type single core optical fiber connector (sectional specification for fiber optic connector-type FC; hereinafter, this is called "FC type optical connector"), F04 type single core optical fiber connector (sectional specification for fiber optic connector-type SC; hereinafter, this is called "SC type optical connector"), F14 type optical fiber connector (type MU connector family; hereinafter, this is called "MU type optical connector", and LC type optical connector and the like are offered.

Furthermore, as the optical fiber connector for multi-core connection, the connection parts such as F13 type multi-core optical fiber (type MPO connector family; hereinafter, this is called "MPO type optical connector"), MPX type optical connector, and MTP type optical connector and the like are offered.

Generally, it is possible for these optical fiber connectors to be connected by being brought face to face with each other from an axial direction of the optical fiber.

For example, in the MPO type optical connector, by inserting the optical fiber connector plugs from the both sides opposing to the optical fiber connector adapter, the optical fiber connector plugs are positioned within an internal housing built in the optical fiber connector adapter, and a plurality of MT connector ferrules which are held at the front ends of optical fiber connector plugs are brought face to face with each other and connected.

In particular, push-pull systems which enable extraction and insertion in the axial direction of the optical fiber are proposed. Because these push-pull type connectors are pulled out and inserted in the axial direction of the optical fiber which is connected, there is a characteristic that the connection of optical fiber can be simply carried out for connection with an adapter attached to a wall surface of an apparatus such as a back plane and the like.

As well-known connection parts as mentioned above, there are Japanese Unexamined Patent Application, First Publication No. H8-5869 (Patent Document 1), Japanese Unexamined Patent Application, First Publication No. H8-240746 (Patent Document 2), and Japanese Unexamined Patent Application, First Publication No. 2000-139642 (Patent Document 3) and the like.

However, when the above-mentioned optical fiber connector is used for the connection of optical fibers on a printed circuit board (for example, a mother board and the like) or within the apparatus, there was a possibility that the view of the worker to the extraction-and-insertion direction of the connector becomes worse; therefore, working hours become long, an end of the ferrule may be broken in the case of inserting the connector, and the connector are knocked or damaged by contacting the connector to the sleeve or the shaft for guiding.

Furthermore, it is necessary to consider about the rearrangement of the devices in order to ensure a space for extracting and inserting the connector, if the installation of the some devices becomes impossible. Thus, space on a substrate could not be used effectively due to the extraction and insertion space.

Furthermore, the direction of attachment and detachment of the connector is not constant, and moreover, there is a possibility of damaging the optical fiber or the surrounding parts by their contact due to the reaction in the case of attachment and detachment of the connector.

Furthermore, it is necessary to simplify attachment and detachment operation in order to shorten the time of connection or improve connection workability. It is possible to maintain stable a urging force applied to the ferrule by engaging a latch using a latch mechanism at the time of attachment and detachment. However, in the case above, the structure becomes complicated and the number of parts increases; therefore, design of the optical connector is time-consuming and costly.

SUMMARY OF THE INVENTION

A object of the present invention is to solve the problems described above.

That is, an object of the present invention is to provide an optical connection structure in which, when a plurality of optical functional components which compose the optical connection structure are connected to each other, the assembly is easy, and a worker can simply conduct the connection operation without damage to the optical fiber, and space on the substrate can be used effectively.

The present invention is an optical connection structure having a pair of connection members which have a function of holding optical fibers and are arranged at the position of being brought face to face with each other, an adapter which mounts the connection members, and a transportation member which transports the connection member in the state of holding the optical fiber in an axial direction of the optical fiber.

According to the present invention, the connection member which is in the state of holding the optical fiber can be transported in an axial direction of the optical fiber by the transportation member, and a pair of optical fibers which are the optical functional components can be easily connected to each other.

Moreover, in the present invention, an urging member which urges the optical fiber in the axial direction of the optical fiber in a state in which the pair of optical fibers which are held respectively by the pair of connection members are brought face to face with each other may be provided.

According to the present invention, a pair of optical fibers are fixed in the state of being brought face to face with each other, and the pair of optical fibers can be connected to each other more closely.

Moreover, in the present invention, a plug which mounts the connection member may be provided.

According to the present invention, when the connection member is handled, the situation of the connection member being directly grasped, and the end portion of the connection member or the end portion of the optical fiber being contaminated by the contact with the other parts and the like, may be avoided.

Moreover, in the present invention, the connection member may be slidably mounted to at least one of the optical fiber and the plug.

According to the present invention, when the connection member is mounted to the adapter, the end portion of the connection member is positioned at the inside of the end portion of the plug, and then the end portion of this plug can be brought face to face with the end portion of the other plug.

Then, the connection member is moved relative to the plug, and a pair of the connection members are brought face to face with each other, and the connection member can thereby be exactly aligned for the adapter.

Furthermore, a possibility that a pair of connection members are in contact with each other and are damaged is further decreased.

Moreover, in the present invention, at least one of the transportation member and the urging member may be attached to the plug.

According to the present invention, the structure of the adapter can be simplified, and assembly operation efficiency in the case of mounting the adapter on the substrate can be improved.

Moreover, in the present invention, at least one of the transportation member and the urging member may be attached to the adapter.

According to the present invention, it is possible to connect the connection member alone, and thereby decrease the number of the parts.

Moreover, in the present invention, the transportation member may have an attachable and detachable structure.

According to the present invention, it is not necessary to prepare a transportation member such as a cam member and the like for each optical connection structure, the number of parts in the overall structure can be decreased, while the optical connection structure being operated accidentally can be prevented, and thereby prevent the state of connection being changed.

Moreover, in the present invention, the urging member may be attached to the transportation member.

According to the present invention, the urging member and the transportation member are unified, and thereby the number of the parts can be decreased.

Moreover, in the present invention, the urging member may have a spring structure.

According to the present invention, it is possible to fix a pair of optical fibers brought face to face with each other, utilizing an elastic force of the spring structure.

Moreover, in the present invention, the urging member may be attached to the transportation member, and it may have a spring structure.

According to the present invention, the number of the parts can be decreased, while it is possible to fix a pair of optical fibers brought face to face with each other, utilizing an elastic force of the spring structure.

Moreover, in the present invention, the optical fibers are brought face to face with each other in one of a pair of connection members.

According to the present invention, it is possible to improve reliability when there are mechanical or thermal changes to the connection member.

Furthermore, in the case of transporting the connection member, reliability of the transportation member can be improved.

Moreover, the connection process can be simplified, and workability can be improved.

Moreover, in the present invention, a positioning member which aligns relative position between the connection members may be provided.

According to the present invention, the front end portions of the connection members can be aligned certainly, thereby bringing the connection members face to face with each other and fixing the connection members by the transportation member can be assisted.

Moreover, in the present invention, the positioning member may be attached to the adapter.

According to the present invention, the number of parts can be decreased, while the connection process can be simplified.

Moreover, in the present invention, the transportation member may be a singular cam member or a plurality of cam members.

According to the present invention, in the case of using a plurality of cam members, the connection process for a plurality of cam members can be efficiently conducted at one time, and the connection process can be simplified.

Moreover, in the present invention, the connection member may be mounted to the adapter from a opening direction of the adapter.

According to the present invention, the connecting operation can be conducted without a burden, yield can be improved, and a connecting operation efficiency can thereby be improved.

Moreover, in the present invention, the transportation member may have a contacting surface with the connection member used for transportation of the connection member, and the contacting surface is inclined against an axial direction of the optical fiber.

According to the present invention, it is possible for the connection member to be transported by pressing little by little successively in conformity with an inclination angle of the contact surface Moreover, in the present invention, the transportation member may have a structure which enables conducting a rotary operation with a vertical axis against the axial direction of the optical fiber.

According to the present invention, a direction of transmitting force applied to the transportation member is shifted from a direction of rotating of which an axis is in a direction perpendicular to an axis of the optical fiber to a direction of an axis of the optical fiber, and by this rotation operation, the connection member can be transmitted in a axial direction of the optical fiber.

Moreover, in the present invention, the transportation member has a cam portion which is arranged directly or indirectly contacting with the connection member, and the cam portion may perform eccentric transportation by rotary operation.

According to the present invention, a direction of transmitting force of the transportation member by the eccentric transportation of the cam portion can be shifted to be operated directly, and thereby the connection member can be transmitted in a direction of the axial of the optical fiber.

Moreover, in the present invention, the transportation member has a power transfer portion and an operation portion which conducts rotary operation, in which the power transfer portion is transported in an axial direction of the optical fiber by the rotary operation of the operation portion.

According to the present invention, a direction of transmitting power of the transportation member by the rotation of the operation portion itself can be shifted to be operated directly, and thereby the connection member can be transmitted in a direction of an axis of the optical fiber.

Moreover, the present invention is an optical connection method using the above-mentioned optical connection structure, in which the connection member in a state of holding the optical fiber is transported in an axial direction of the optical fiber by conducting rotary operation of the transportation member which has a structure capable of rotary operation with a vertical axis against an axial direction of the optical fiber.

According to the present invention, a direction of operation can be changed by shifting a direction of transmitting power due to rotary operation of the transportation member, and thereby the connecting operation can be conducted from a position which can be conducted easily, that is from an opening direction of the adapter which mounts the connection member, and as a result, connecting operation efficiency can be improved.

Moreover, in the present invention, a power transfer portion of the transportation member which is arranged contacting with the connection member may perform eccentric transportation by rotary operation of an operation portion of the transportation member.

According to the present invention, a direction of transmitting power due to rotary operation of the transportation member can be shifted, and thereby the connecting operation can be conducted from a position which can be conducted easily.

Moreover, in the present invention, a power transfer portion of the transportation member may be transported in an axial direction of the optical fiber by rotary operation of an operation portion of the transportation member.

According to the present invention, a direction of transmitting power due to rotary operation of the transportation member can be shifted, and thereby the connecting operation for the connection member can be conducted by a simple operation.

DETAILED DESCRIPTION OF THE INVENTION

Hereinafter, embodiments of the present invention will be explained with reference to the figures.

Figure 1A:
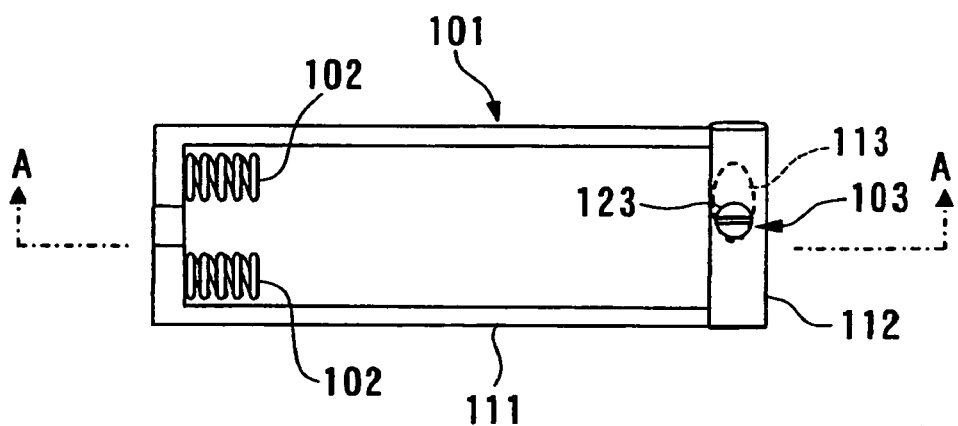
FIG. 1A is a plan view showing an example of an adapter which constitutes an optical connection structure according to a first embodiment of the present invention.
Figure 1B:
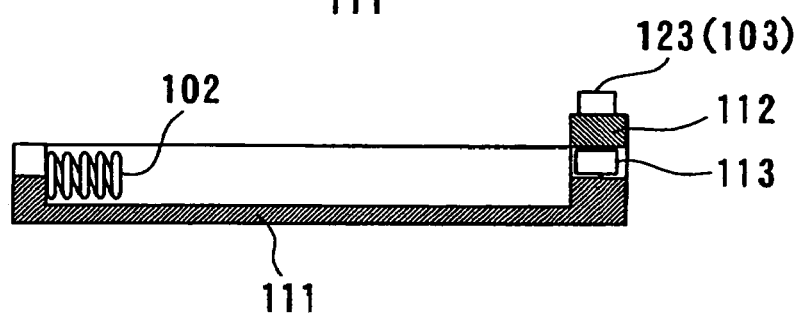
FIG. 1B is an A—A line vertical sectional view in FIG. 1A.
Figure 1C:
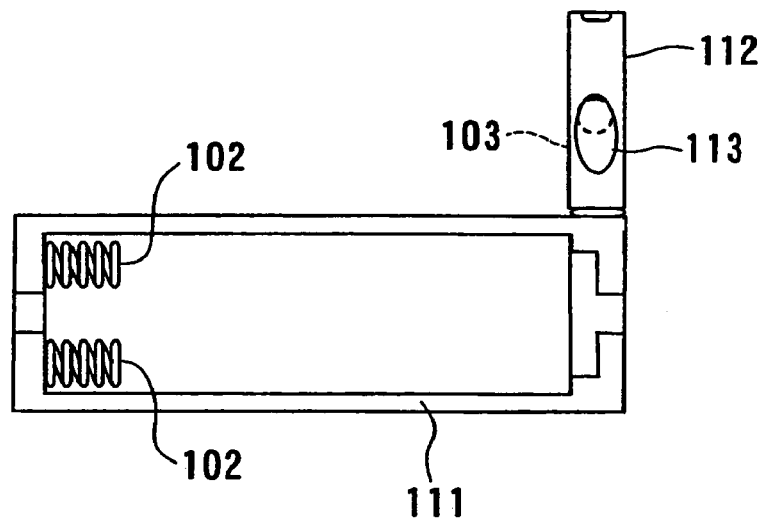
FIG. 1C shows an example of the adapter which constitutes the optical connection structure according to the first embodiment of the present invention, and is a plan view in the state in which a cam member attachment member is opened.

FIGS. 1A–1C are mimetic views showing an example of an adapter used for a first optical connection structure which performs the present invention.

In the figures, reference numeral 101 shows an adapter, reference numeral 102 shows an urging member, reference numeral 103 shows a transportation member, reference numeral 111 shows an adapter body, reference numeral 112 shows an attachment member which attaches the transportation member to the adapter, reference numeral 113 shows a power transfer portion, and reference numeral 123 shows a power transfer operation portion, respectively.

A first adapter 101 shown in FIG. 3A as mentioned later is a top opening type. The first adapter 101 is provided with the adapter body 111 in which is mounted the connection member 1 in which the optical fiber 10 is held and the connection member 2 in which the optical fiber 20 is held.

These connection members 1 and 2 have a function which holds the optical fiber, and are arranged at opposing positions to each other.

The adapter 101 is provided with the urging member 102 which urges the connection members 1 and 2 in an axial direction of the optical fiber.

This urging means has a spring structure.

Here, the urging member 102 which has the spring structure means that which puts a portion between the end portions of the optical fibers in an axial direction of the optical fiber, and for example, means that which has an elastic restoring force for urging by a spring (coil spring), a flat spring or the like.

Moreover, the adapter 101 is provided with a cam member 103 as a transportation member which transports the connection member 1 and 2 in an axial direction of the optical fiber.

This cam member 103 is attached via the attachment member 112 which can be opened upward from the adapter 101.

Figure 2A:
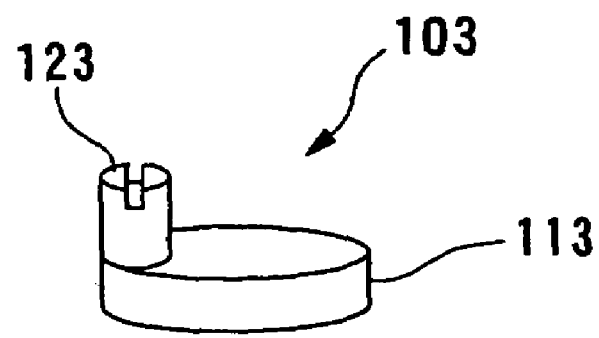
FIG. 2A is a perspective view showing an example of the cam member which constitutes the optical connection structure of the present invention.
Figure 2B:
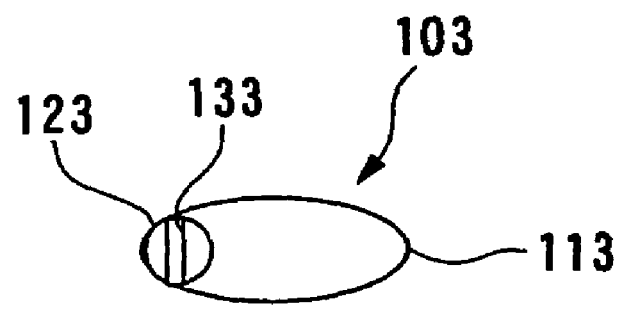
FIG. 2B is a plan view showing an example of a cam member which constitutes the optical connection structure of the present invention.

FIG. 2A is a perspective view showing an example of the cam member used for the first optical connection structure of the present embodiment. FIG. 2B is an upper face plan view thereof.

A first cam member 103 is provided with a cam portion 113 as the power transfer portion which contacts and urges the connection member 1 or the connection member 2, a cam operation portion 123 as the power transfer operation portion in order to operate rotatably the cam member 103 itself, and an operation groove 133 in which the operation device is inserted in the case of the rotary operation.

In the first cam member 103 of which an example is shown in FIG. 2A and FIG. 2B, an elliptical form in a plan view of the cam member 113 is provided, and, on the upper surface of this cam member 113, the cam operation portion 123 which forms a rotation axis is provided spreading to upper portion.

When the cam member 103 is mounted to the adapter 101 as shown in FIG. 1A–1C, only a connection member can be connected, and thereby the number of parts can be reduced.

Moreover, in the case in which the cam member 103 is mounted to the plug (as described below), the structure of the adapter 101 can be simplified, and assembly operation efficiency in the case of mounting the adapter 101 on the substrate can be improved.

Figure 3A:
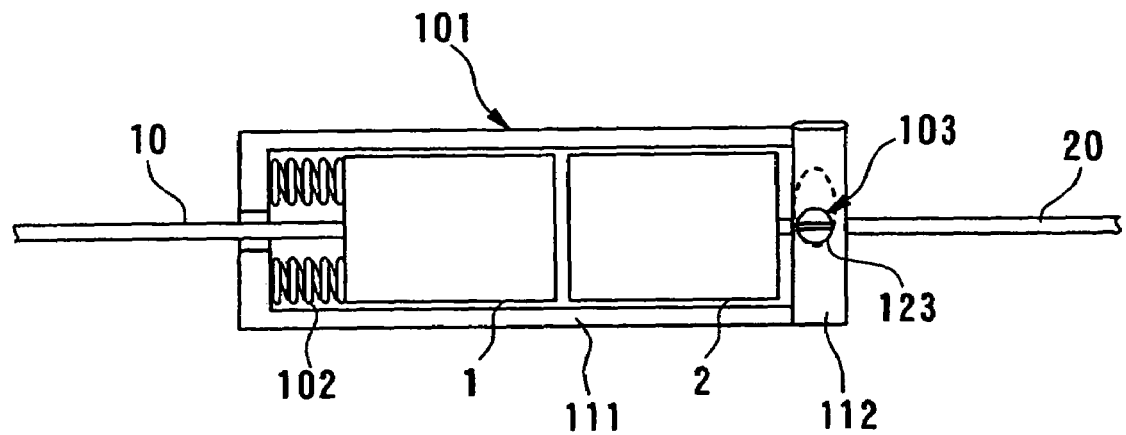
FIGS. 3A–3C are plan views showing connection process one by one in the case of constituting the first optical connection structure of the present invention.
Figure 3B:
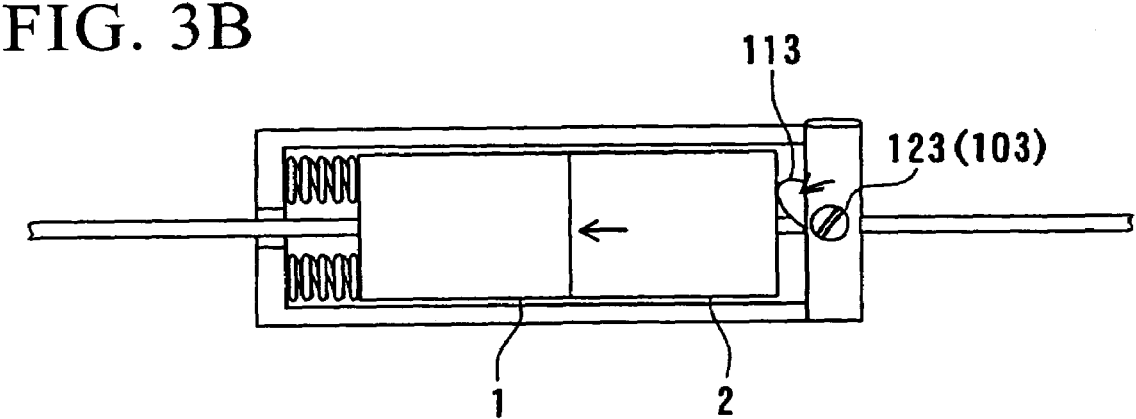
Figure 3C:
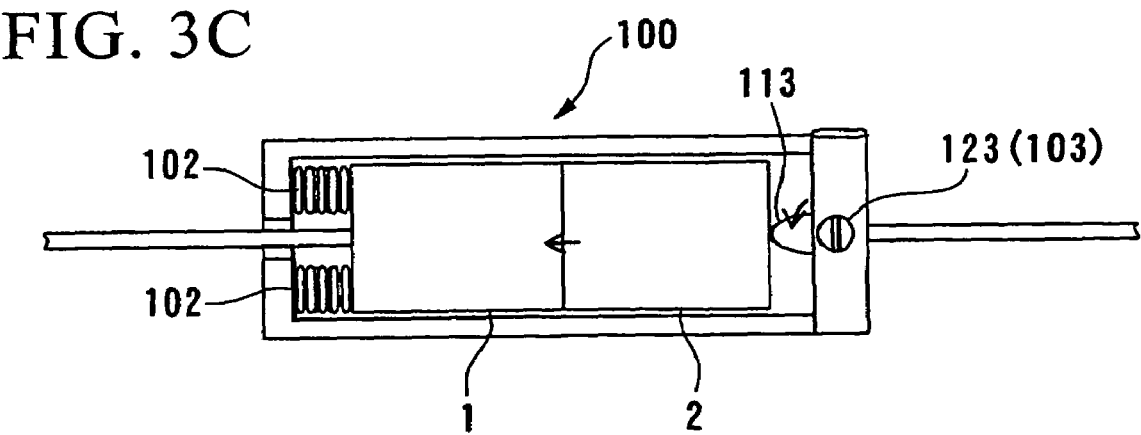

Moreover, as a method of producing the first optical connection structure 100 of the present embodiment, as shown in FIG. 3A–3C, the connection members 1 and 2 to which the optical fiber 10 and 20 are held (mounted) are mounted to the upper opening type of adapter 101 from the upper portion of the adapter 101 with an interval, and after that, the attachment member 112 is closed (see FIG. 3A).

Furthermore, by rotating the cam member 103, the connection member 2 is made to approach the connection member 1, and the connection member 2 is contacted with and is brought face to face with the connection member 1 (see FIG. 3B).

Then, by further rotating the cam member 103, the connection member 2 is urged by a spring 102 which is the urging member installed at a backside of the connection member 1, the connection members 1 and 2 are fixed in the state of being brought face to face with each other, and the first optical connection structure of the present embodiment can be obtained (see FIG. 3C).

As mentioned above, in the case in which the connection members 1 and 2 are mounted to the adapter 101, the connection members 1 and 2 can be mounted with an interval, and it can thereby be prevented that the connection member are contacted with each other.

For this reason, it is prevented that the connection member is damaged by contact. Moreover, in the case in which the optical fiber has a structure of projecting from the connection member, it is prevented that the optical fibers come into contact with each other and are damaged at the time of mounting the connection members.

Moreover, by using the cam member and changing an operating direction, the connection operation can be conducted from more convenient position, that is from an upper portion, thereby a connecting workability can be improved.

Moreover, in this embodiment, the material and the shape of the connection member which is used is not especially limited.

For example, as a material, one made of zirconia, glass, plastic, ceramics, metal, or the like is preferably used.

Moreover, for example, a circular type or a quadrangle type of cross-sectional form is preferably used.

A shape of a through hole through which is inserted and which fixes the optical fiber may be of various types, as long as it is possible for the optical fiber to be fixed stably; however, a cylindrical shape or a triangular prism shape is preferably used.

Moreover, the optical fiber may be fixed permanently to the connection member with adhesive, or may be fixed replaceably by mechanical holding.

Furthermore, the number of the through holes with which the connection member is provided is not restricted, and the connection member may be provided with the through holes which can fix a plurality of optical fibers used for maintenance inspections.

In the case of using adhesive to fix the connection member and the optical fiber, various types can be used, and for example, various kinds of pressure-sensitive adhesive (mordant), such as a urethane type, an acrylic type, an epoxy type, a nylon type, a phenol type, a polyimide type, a vinyl type, a silicone type, a rubber type, a fluorination epoxy type, a fluorination acrylic type, and a fluorination polyimide type, thermoplastic adhesive, thermo-setting type adhesive, and ultraviolet-light (UV) curable adhesive can be used.

In view of ease of working, an UV curable adhesive or thermoplastic adhesive may be preferably used.

Moreover, a connection method of the optical fiber is not limited at all, and any existing connection method of the optical fiber can be used. Furthermore, the optical fiber can be connected by joining a refractive index matching agent in a space between the optical fibers. Moreover, PC (Physical Contact) connection by bringing face to face the optical fibers may be conducted.

The optical fiber which is used for the optical fiber connection parts of the present embodiment is selectly used depending on the application purpose of the optical fiber connection parts, and for example, a single mode or a multimode optical fiber made of quartz or plastic, a multimode, or the like is preferably used.

In the case of using the refractive index matching agent, a material, a state, and an installation method are not especially limited, a material may be selectively used depending on the refractive index of the optical fiber or the kind of the material, and, for example, silicone oil, silicone grease or the like is preferably used.

Moreover, a state of the refractive index matching agent may be liquid or solid, for example, may be oil-like, grease-like, gel-like, or film-like.

Force which is applied to sections of the optical fibers in order to bring the optical fibers face to face with each other may be given by using any known method. Moreover, the force may be directly applied in a central axial direction of the optical fiber, or the thrust in a central axial direction of the optical transmitting medium may be indirectly applied to the connection member.

Moreover, it is desirable for the force to be applied using an elastic power by a flat spring installed in the plug or the adapter, resin, or the like.

Figure 4A:
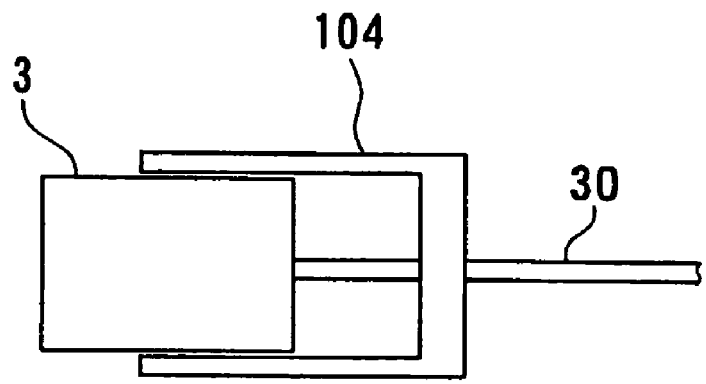
FIG. 4A shows an example of the optical connection structure provided with a plug in the present invention, and is a plan view showing a first state of the optical connection structure.
Figure 4B:
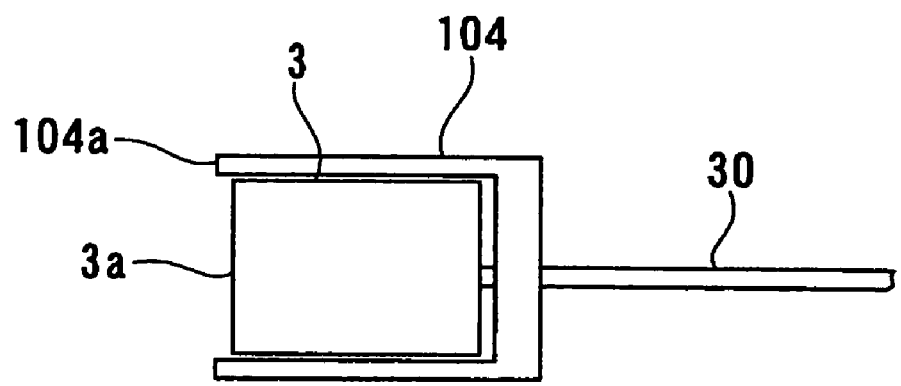
FIG. 4B shows an example of the optical connection structure provided with a plug in the present invention, and is a plan view showing a second state of the optical connection structure.

FIG. 4A and FIG. 4B are plan views showing an example of the plug used for the optical connection structure of the present embodiment.

As shown in FIG. 4A, because the optical fiber 30 is mounted to the first plug 104, and the connection member 3 is further mounted to the plug 104, the plug 104 may be grasped in the case of dealing with the connection member 3, and it can thereby be prevented that the end portion of the connection member 3 and the end portion of the optical fiber 30 are contaminated by contact with a hand, other parts, or the like.

Moreover, by mounting the connection member 3 so that the connection member 3 can slide against the plug 104, as shown in FIG. 4B, when the adapter is mounted, the end portion 3a of the connection member 3 is positioned at the inside of the end portion 104a of the plug 104, then the end portion 104a of the plug 104 is brought face to face with the end portion of the other plug, and thereby the connection member can be exactly aligned to the adapter, and a further probability that the connection members are contact with each other and are damaged can be decreased.

Figure 5:
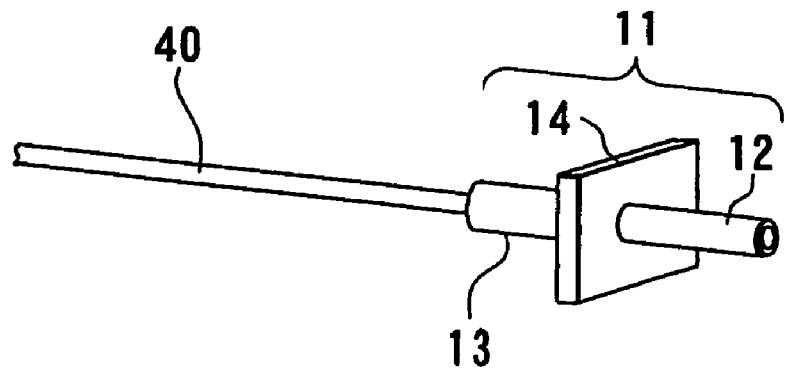
FIG. 5 is a perspective view showing an example of the connection member which constitutes the optical connection structure of the present invention.

FIG. 5 is a perspective view showing an example of the connection member used for the second optical connection structure of the present embodiment.

Figure 6:
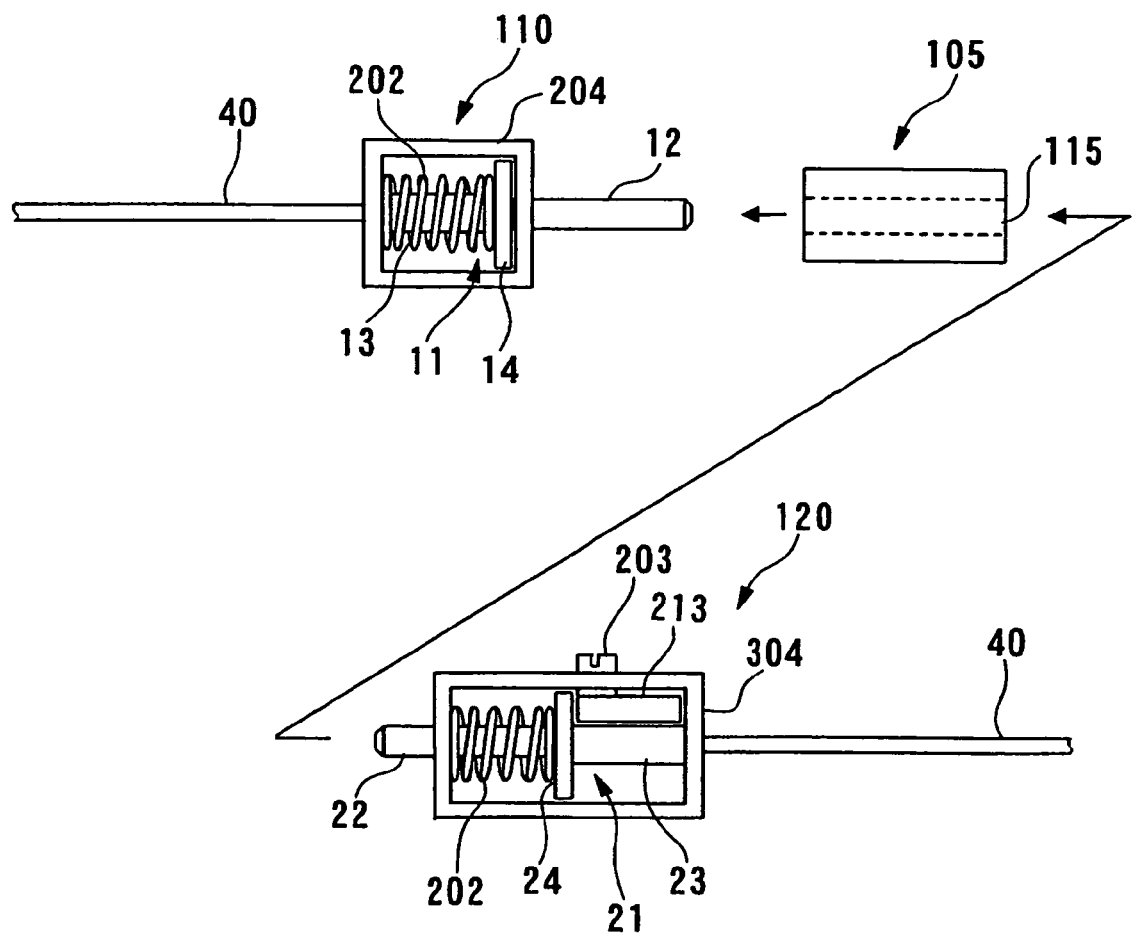
FIG. 6 is a side view showing an example of a plug fixing connection member which constitutes the optical connection structure of the present invention.

The connection member 11 is provided with a flange portion 14 with which a spring 202 as the urging member is in contact, a front end portion 12 which is positioned at the front side of the flange portion 14 as shown in FIG. 6, and a base end portion 13 which is positioned at the rear side of the flange portion 14, and the optical fiber is connected to the base end portion 13.

FIG. 6 is a side view showing an example of the connecting process of a pair of connection members used for the second optical connection structure of the present embodiment.

A first plug fixing connection member 110 in which the connection member 11 is fixed to the plug 204 and the second plug fixing connection member 120 in which the connection member 21 is fixed to the plug 304 and the cam member 203 is mounted are brought face to face with each other, and thereby a pair of connection members 11 and 21 are connected.

The first plug fixing connection member 110 is composed of the plug 204, the connection member 11 which is mounted to the plug 204 and the optical fiber 40 is connected to a base end portion 13 thereof, and a spring (the urging member) 202 which is mounted to the base end portion 13 of the connection member 11 in the state of contacting with the flange portion 14 of the connection member 11.

On the other hand, the second plug fixing connection member 120 is composed of the plug 304, the connection member 21 which is mounted to the plug 304 and the optical fiber 40 is connected to a base end portion 23 thereof, and a spring (the urging member) 202 which is mounted to the front end portion 22 of the connection member 21 in contact with the flange portion 24 of the connection member 21, and a second cam member (the transportation member) 203 which is mounted to the plug 304 so that it contacts with a side surface at the side of the base end portion of the flange portion 24 of the connection member 21.

Figure 7A:
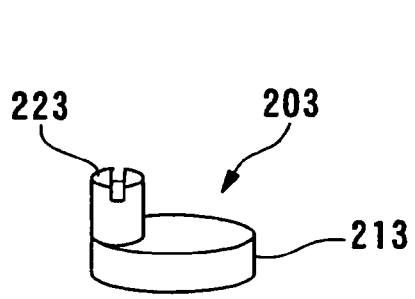
FIG. 7A is a perspective view showing a second example of the cam member which constitutes the optical connection structure of the present invention.
Figure 7B:
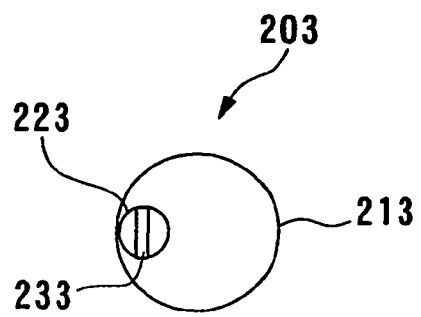
FIG. 7B is a plan view showing a second example of the cam member which constitutes the optical connection structure of the present invention.

FIG. 7A is a perspective view showing an example of the cam member used for the second optical connection structure of the present embodiment, and FIG. 7B is a top view thereof.

As shown in FIG. 7A and FIG. 7B, the second cam member 203 is provided with a cam portion 213 which contacts with and urges the flange portion 24 in the connection member 21, a cam operation portion 223 which rotates the cam member itself, and a cam operation groove 233 in which the operation device is inserted for the rotating operation.

The cam portion 213 in this embodiment has a circular shape in plan view.

In addition, as shown in FIG. 1A, the cam member 203 as the transportation member may be mounted to the adapter, and the connection member may be indirectly transported by moving the plug using the cam member.

Figure 8:
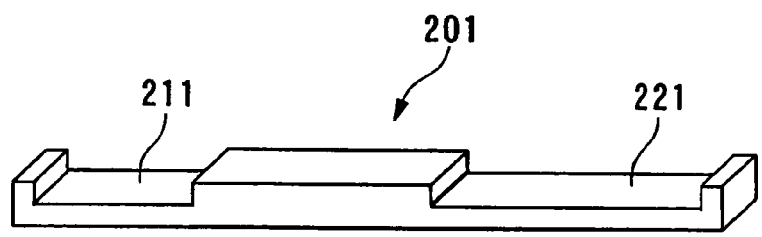
FIG. 8 is a perspective view showing a second example of the adapter which constitutes the optical connection structure of the present invention.

Moreover, FIG. 8 is a perspective view showing an example of the adapter used for the second optical connection structure of the present embodiment.

As shown in FIG. 8, a second adapter 201 is provided with two hollow stepped portions for fixing the plug 211 and 221 which brings a pair of connection members face to face with each other. The stepped portions are arranged respectively with an interval.

Figure 9A:
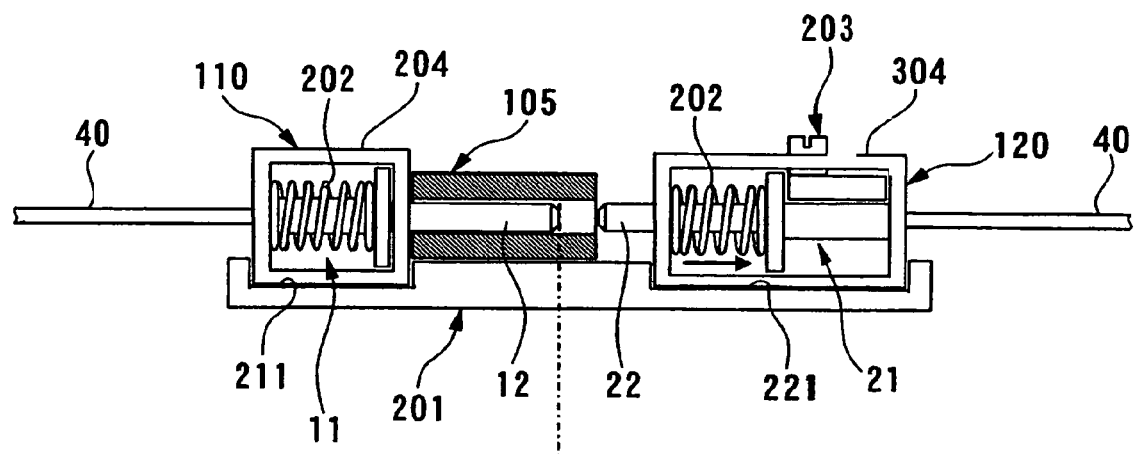
FIG. 9A and FIG. 9B are side views showing connection process in the case of constituting a second optical connection structure of the present invention.
Figure 9B:
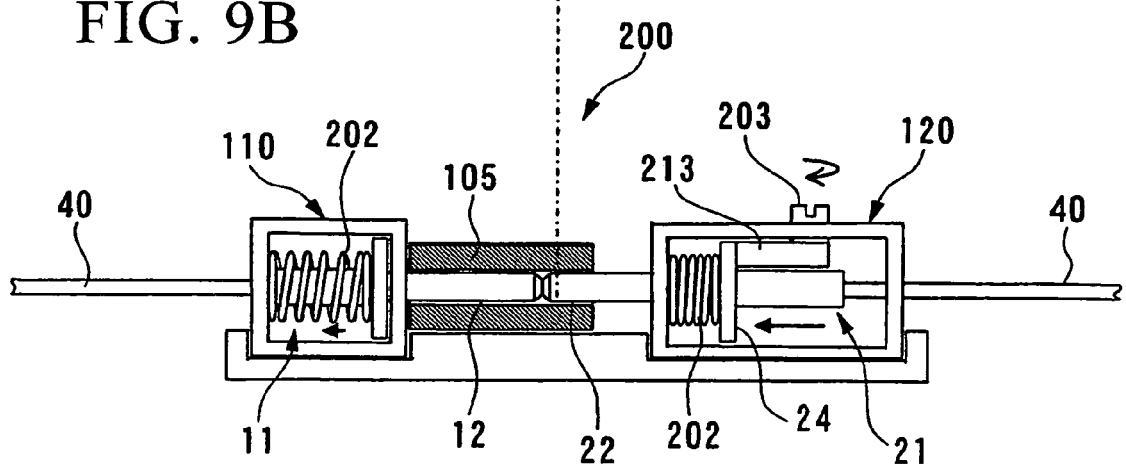

Furthermore, as a method of manufacturing the second optical connection structure according to the present embodiment, as shown in FIG. 9A and FIG. 9B, in the case of connecting two connection members 11 and 21, first of all, the respective plug fixing connection members 110 and 120 are installed at two hollow stepped portions for fixing the plug 211 and 221 which are provided to the second adapter 201 so that the front end portions 12 and 22 of the respective connection member 11 and 21 are brought face to face with each other (see FIG. 9A).

At this time, a positioning member 105 is previously attached to the front end portion 12 of the connection member 11 in the first plug fixing connection members 110.

Next, an urging force toward the side of the base end portion of the spring 202 is bound by rotating the cam member 203 provided to the second plug fixing connection member 120, and the front end portion 22 of the connection member 21 is inserted in an inserting hole 115 for positioning the positioning member 105.

Thereby, the connection members 12 and 22 are positioned and are urged by the spring 202 as the urging member, are brought face to face with each other, and are fixed (see FIG. 9B).

By such a method, the second optical connection structure 200 of the present embodiment can be obtained.

In addition, as shown in FIG. 6, the connection member 11 may be mounted slidably in the plug 204, and may be mounted to the plug 204 in a state in which the side of the base portion of the flange portion 14 is urged by the spring 202 as the urging member, and is urged toward the side of the front end portion.

Moreover, as shown in FIG. 6, the cam member 203 may be mounted to the plug 304 in which the connection member 21 is mounted slidably, and according to rotating the cam member 203, the side of the front end portion of the flange portion 24 is urged by the spring 202 as the urging member, and thereby the connection member 21 urged toward the side of the base end portion may be transported.

Furthermore, the connection member 11 and 21 (the plug fixing connection member 110 and 120) may be attached and detached from the adapter or the plug.

Figure 10:
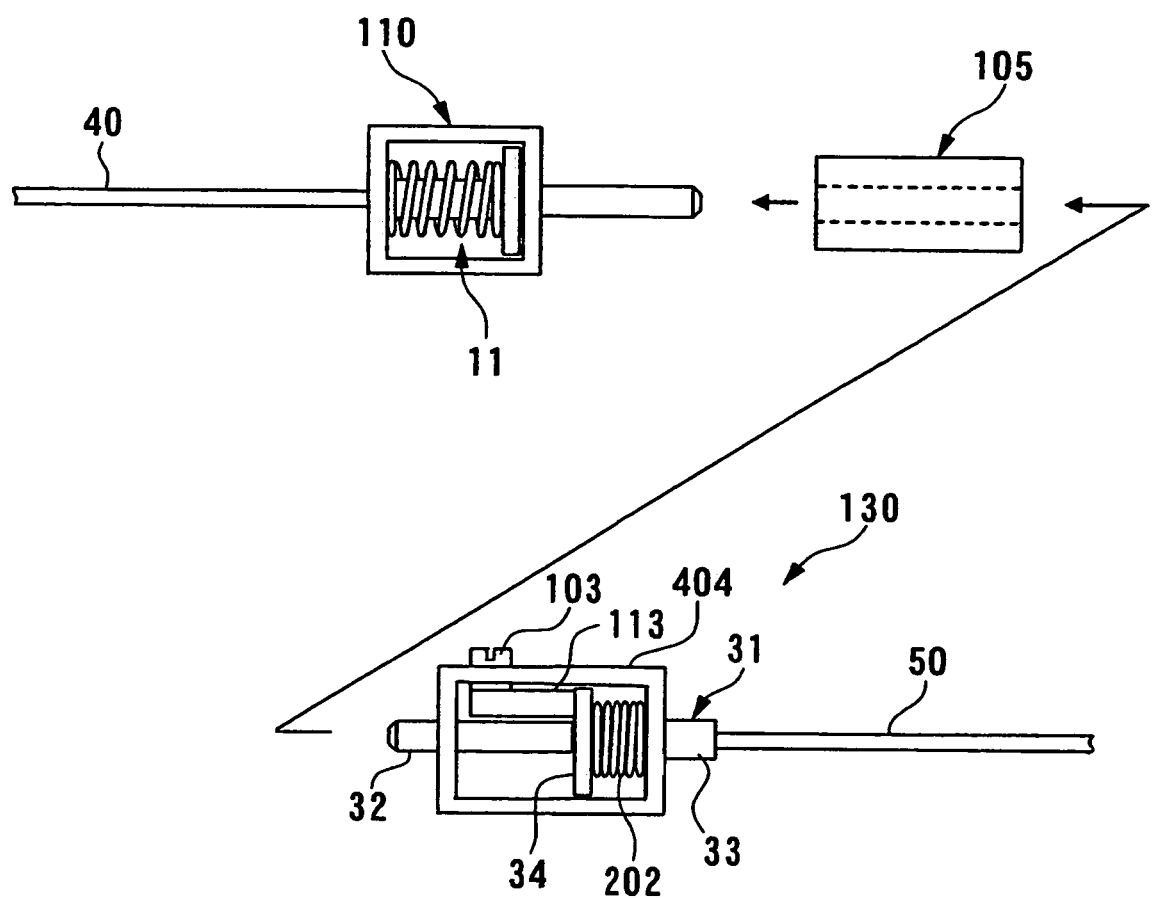
FIG. 10 is a side view showing a second example of a plug fixing connection member constituting the optical connection structure of the present invention.
Figure 11A:
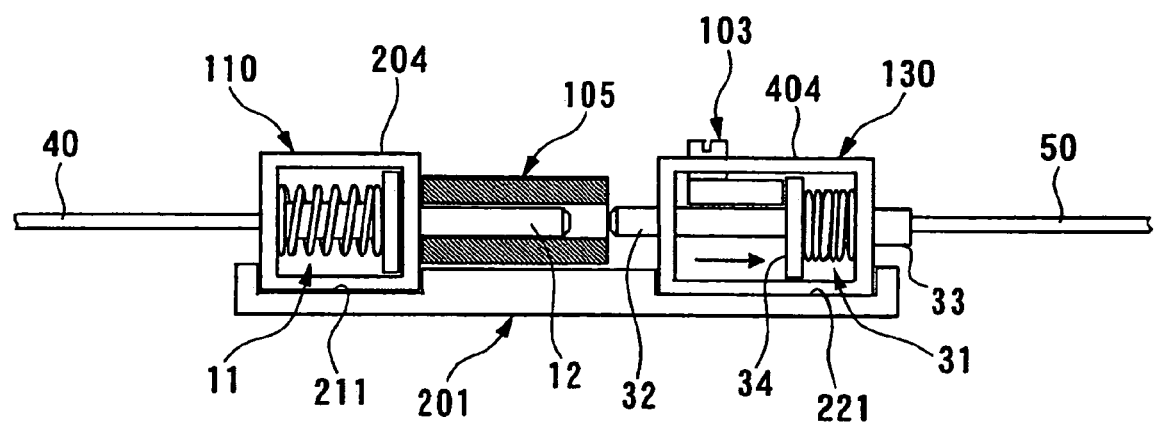
FIG. 11A and FIG. 11B are side views showing connection process in the case of constituting a third optical connection structure of the present invention.
Figure 11B:
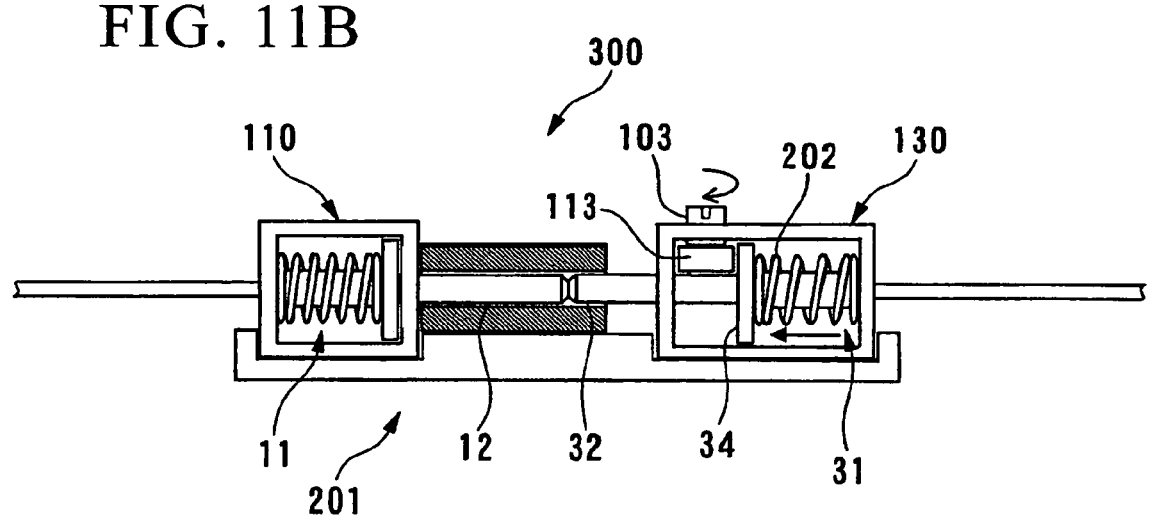

Moreover, as shown in FIG. 10, FIG. 11A, and FIG. 11B, the connection of a pair of connection member may be conducted by the following way. That is, in the state of being previously urged by the spring which is the urging member, the connection member 31 is fixed so as not to move by the cam member 103, the fixing force is released by rotating the cam member 103, the connection member 31 is transported, while the connection member 31 is brought face to face with the other connection member 11 and is fixed.

FIG. 10, FIG. 11A, and FIG. 11B are plan views showing an example of the connection method for a pair of the connection members in the case of forming the third optical connection structure.

In the third optical connection structure of the present embodiment, as shown in FIG. 10, the connection members 11 and 31 are connected by being brought face to face the above-mentioned first plug fixing connection member 110 and the third plug fixing connection member 130.

The third plug fixing connection member 130 is composed of the plug 404, the connection member 31 which is mounted to the plug 404, and the optical fiber 50 is connected to the base end portion 33 thereof, the spring (the urging member) 202 which is mounted to the base end portion 33 of the connection member 31 in the state of contacting with the flange portion 34 of the connection portion 31, and the first cam member 103 (see FIG. 2A and FIG. 2B) which is mounted to the plug 404 so as to being contact with the side of the front end portion of the flange portion 34 of the connection member 31.

Moreover, as a method for manufacturing the third optical connection structure according to the present embodiment, as shown in FIG. 11A and FIG. 11B, in the case of connecting two connection members 11 and 31, first of all, the respective plug fixing connection members 110 and 130 are installed to two hollow stepped portions for fixing the plug 211 and 221 which are provided to the second adapter 201 as mentioned above so that the front end portions 12 and 32 of the respective connection members 11 and 31 are brought face to face with each other (see FIG. 11A).

At this time, a positioning member 105 is previously attached to the front end portion 12 of the connection member 11 in the first plug fixing connection members 110.

Next, an urging force toward the side of the front end portion of the spring 202 is released by rotating the cam member 103 which is provided to the third plug fixing connection member 130, and thereby the front end portion 32 of the connection member 31 is inserted in the positioning member 105 by the urging force of the spring 202.

Thereby, the front end portions 12 and 32 of the connection members 11 and 31 are positioned, are urged by the spring 202 as the urging member, are brought face to face with each other, and are fixed (see FIG. 11B).

By such a method, the third optical connection structure 300 of the present embodiment can be obtained.

In addition, although the first cam member 103 mentioned above was used as the transportation member which is mounted to the plug 404 in the present embodiment, the second cam member 203, not the first cam member 103 mentioned above, may be used as the cam member of the present embodiment.

Next, the plug which is used for the fourth optical connection structure 400 (FIG. 13A) according to the present embodiment is explained.

FIG. 12, and FIG. 13A–FIG. 13C are plan views showing an example of the connection method for a pair of the connection members in the case of forming the fourth optical connection structure.

Figure 12:
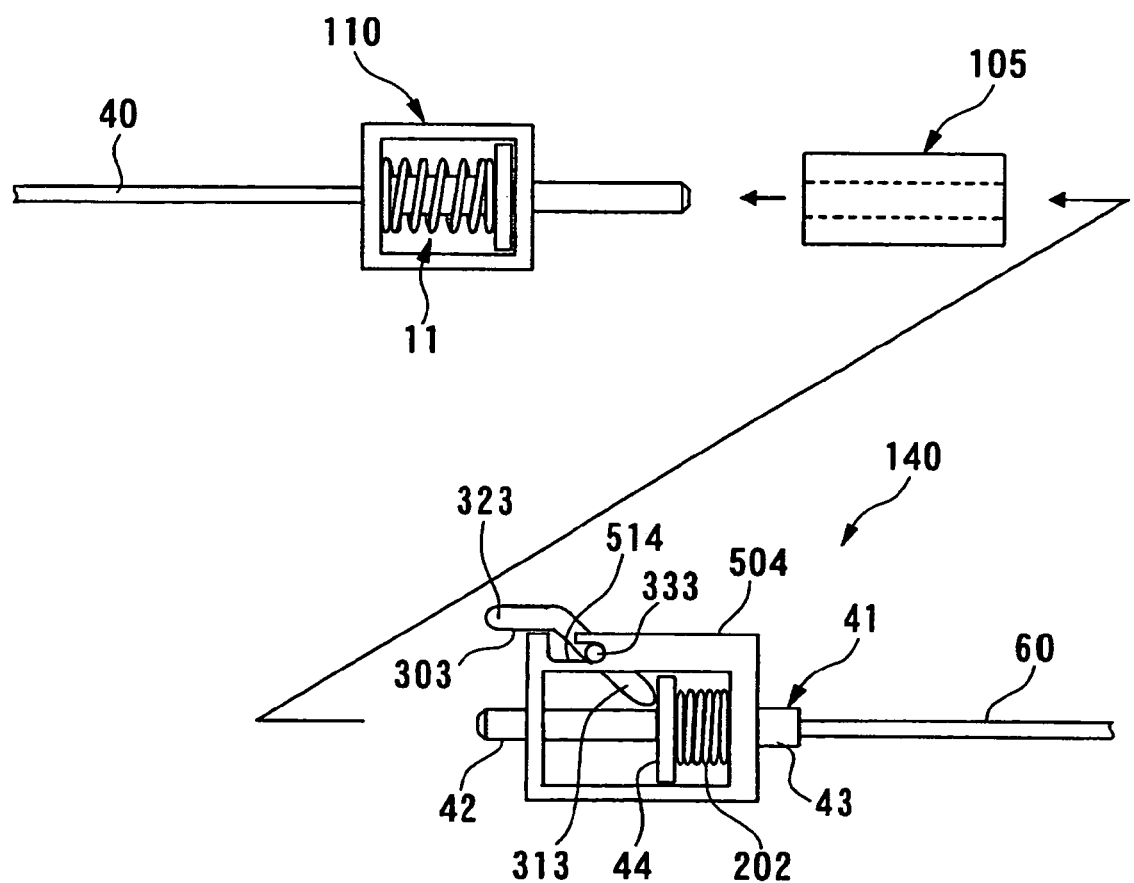
FIG. 12 is a side view showing a third example of a plug fixing connection member constituting the optical connection structure of the present invention.

In the fourth optical connection structure of the present embodiment, as shown in FIG. 12, the connection members 11 and 41 are connected by being brought face to face with the above-mentioned first plug fixing connection member 110 and the fourth plug fixing connection member 140 which fixes the connection member 41 to the plug 504 and mounts the cam member 303 attachably and detachably at the side of the front end portion 42 of the connection member 41.

The fourth plug fixing connection member 140 is composed of the plug 504, the connection member 41 which is mounted the plug 504, and the optical fiber 60 is connected to the base end portion 43 thereof, the spring (the urging member) 202 which is mounted to the base end portion 43 of the connection member 41 in contact with the flange portion 44 of the connection portion 41, and the third cam member (the transportation member) 303 which is mounted attachably and detachably to the plug 504 so as to be in contact with the side of the front end portion of the flange portion 44 of the connection member 41.

This cam member 303 is provided with an approximately dogleg shape of substance, and is composed of a cam member 313 at the side of one end of the substance, an operation portion 323 at the side of the other end of the substance, and a cam operation fulcrum 333 of a convex portion which is provided so as to be extended toward the side from the side surface of the substance.

The cam member 303 is mounted to the plug in the state that the cam operation fulcrum 333 thereof is taken in a cam member fixing groove 514 of the plug 504.

In the case in which the operation portion 323 of the cam member 303 is rotated, the operation portion 323 is rotated with a fulcrum which is a contact point of the cam operation fulcrum 333 and the cam member fixing groove 514. By operating the operation member 323, the cam member 313 is in contact with the flange portion 44 of the connection member 41, and the connection member 41 can be transported in the longitudinal direction thereof.

Figure 13A:
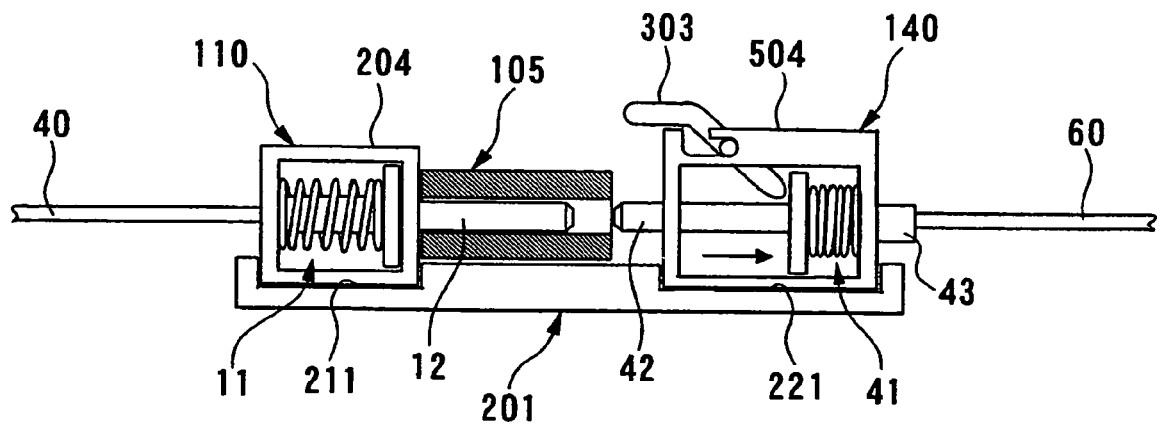
FIGS. 13A–13C are side views showing connection process in the case of constituting a fourth optical connection structure of the present invention.
Figure 13B:
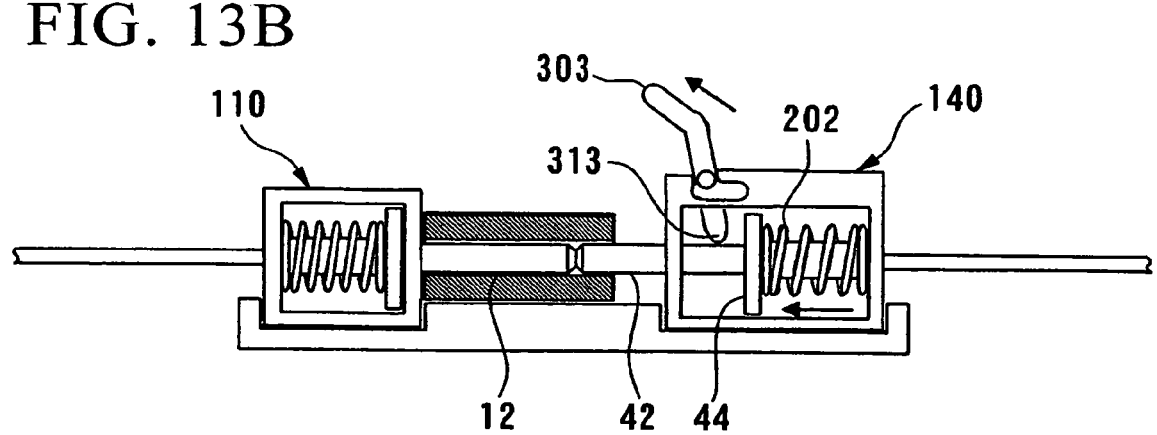

As a method of manufacturing the fourth optical connection structure according to the present embodiment, as shown in FIG. 13A and FIG. 13B, in the case of connecting two connection members 11 and 41, first of all, the respective plug fixing connection members 110 and 140 are installed in two hollow stepped portions for fixing the plug 211 and 221 which are provided to the second adapter 201 so that the front end portions 12 and 42 of the respective connection member 11 and 41 are brought face to face with each other (see FIG. 13A).

At this time, a positioning member 105 is previously attached to the front end portion 12 of the connection member 11 in the first plug fixing connection members 110.

Next, an urging force toward the side of the front end portion of the spring 202 is released by rotating the cam member 303 which is provided to the fourth plug fixing connection member 140, and thereby the front end portion 42 of the connection member 41 is inserted in the positioning member 105 by the urging force of the spring 202.

Thereby, the front end portions 12 and 42 of the connection members 11 and 41 are positioned, and are urged by the spring 202 as the urging member, are brought face to fact at each other, and fixed (see FIG. 13B).

Figure 13C:
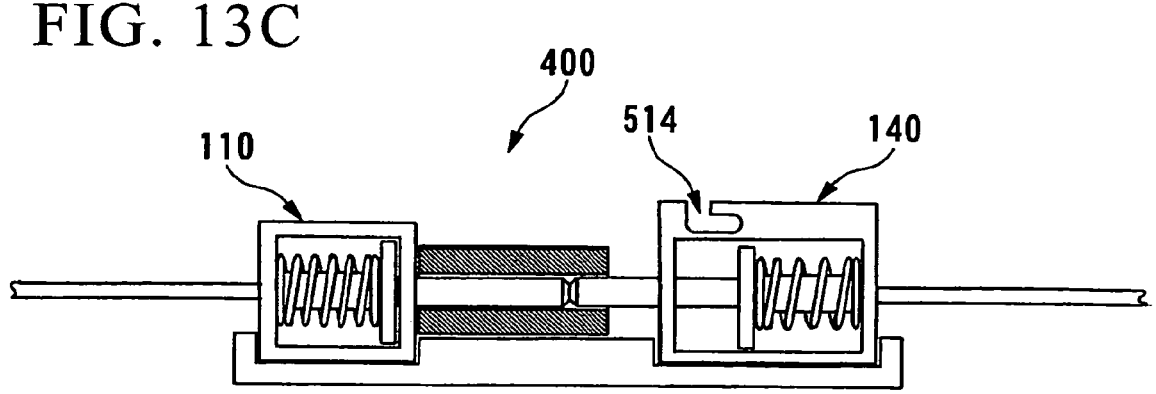

Then, the cam member 303 is extracted from the cam member fixing groove 514 of the plug 504 (see FIG. 13C).

By such a method, the fourth optical connection structure 400 of the present embodiment can be obtained.

Thus, a shape (structure) of the cam member may be, as shown in FIG. 2 and FIG. 7, a rotary knob type, or, as shown in FIG. 12A and FIG. 13A, a lever type. The shape of the cam member is not especially limited as long as the shape can construct the optical connection structure, for example, the shape of the connection member, the shape of the plug, and the like.

Moreover, in the case in which the fourth cam member 303 according to the present embodiment can be attached and detached from the plug 504, it is not necessary for the cam member to be provided for each of a set of optical connection structure, and thereby the number of the parts in a whole structure decreases, while it is prevented that the wrong operation is carried out accidentally, and the connecting state changes.

Next, the plug used for the fifth optical connection structure 500 according to the present embodiment (FIG. 7E) is explained.

Figure 14:
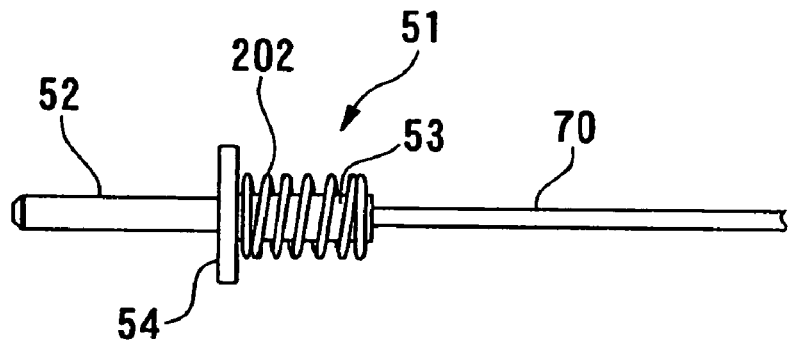
FIG. 14 is a side view showing a second example of a connection member constituting the optical connection structure of the present invention.
Figure 15:
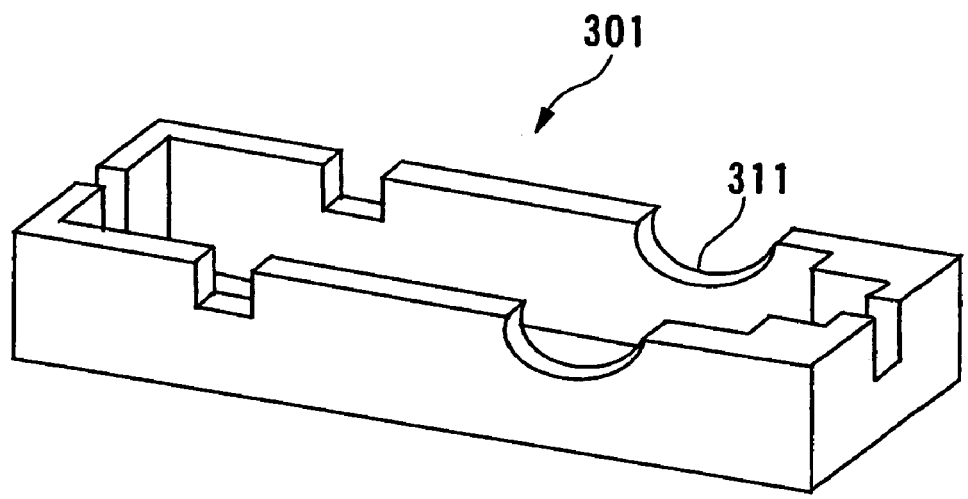
FIG. 15 is a perspective view showing a third example of the adapter constituting the optical connection structure of the present invention.
Figure 16:
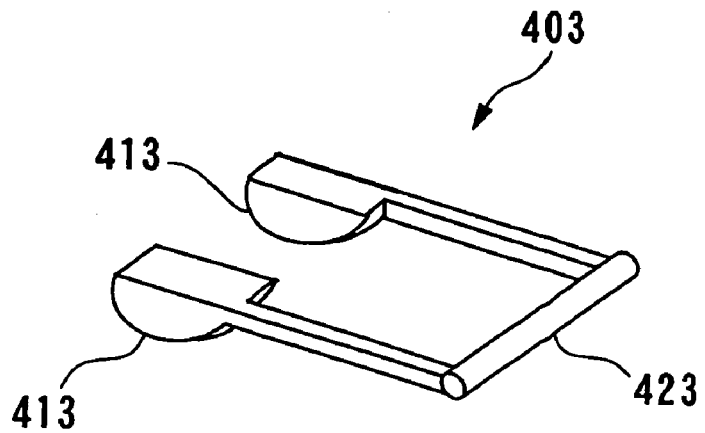
FIG. 16 is a perspective view showing a fourth example of the cam member constituting the optical connection structure of the present invention.

FIG. 14 is a plan view showing an example of the connection member used for the fifth optical connection structure according to the present embodiment. FIG. 15 is a perspective view showing an example of the adapter used in the fifth optical connection structure. FIG. 16 is a perspective view showing an example of the cam member used in the fifth optical connection structure.

As well as the connection member 11 as shown in FIG. 5, the connection member 51 as shown in FIG. 14 is provided with a flange portion 54 with which a spring 202 as the urging member is in contact, an front end portion 52 which is positioned at the front side of the flange portion 54, and a base end portion 53 which is positioned at the rear side of the flange portion 54.

In the connection member 51, the optical fiber 70 is connected to the base end portion 53 thereof, and furthermore the spring 202 is mounted to the base end portion 53 thereof.

The third adapter 301 according to the present embodiment as shown in FIG. 15 is a frame which has an open upper side and a bottom. In the third adapter 301, it is possible for a pair of the connection members to be brought face to face with each other and to be arranged respectively with an interval, while a cam member fixing groove 311 in which the cam member 403 is mounted to, is provided at the side frame portion along the axial direction of the optical fiber.

A fourth cam member 403 according to the present embodiment as shown in FIG. 16 is provided with a cam portion 413 as the power transfer portion which is in contact with and urges the flange portion 54 of the connection member 51, a cam operation portion 423 as the power transfer operation portion in order to rotate the cam member 403 itself.

FIG. 17A–FIG. 17E are plan views showing an example of the connection method of a pair of the connection member in the case of forming the fifth optical connection structure in order of process.

Figure 17A:
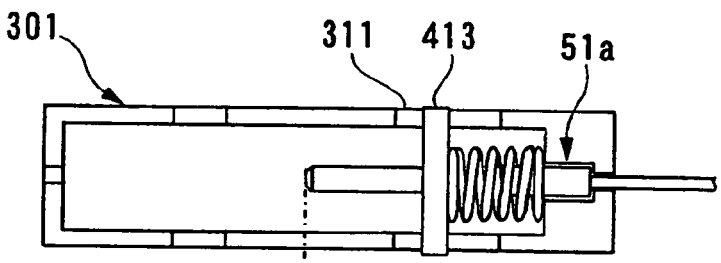
FIGS. 17A–17E are side views showing connection processes in the case of constituting a fifth optical connection structure of the present invention.

First of all, the connection member 51a as shown in FIG. 14 is mounted to the third adapter 301 as shown in FIG. 15 (see FIG. 17A).

Figure 17B:
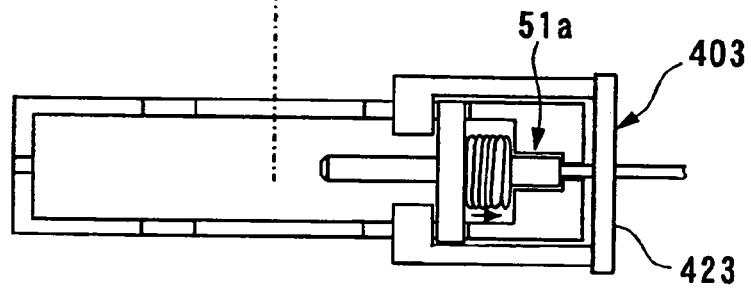

Next, the fourth cam member 403 as shown in FIG. 16 is mounted to the adapter 301, that is, the cam member 413 of the fourth cam member 403 is engaged in the cam member fixing groove 311 of the third adapter 301, and the operation portion 423 of the cam member 403 is pushed in the right hand direction in the figure (see FIG. 17B).

Figure 17C:
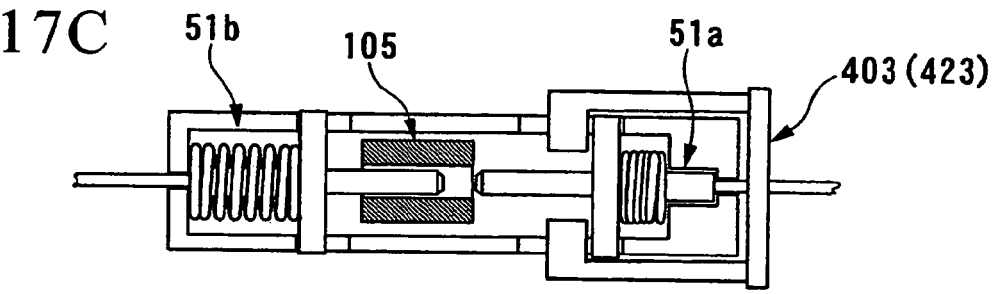

Moreover, another adapter 51b is mounted to the adapter 301 (see FIG. 17C).

Furthermore, the cam member 403 is moved along an axial direction of the optical fiber, that is, the cam member 403 is rotated in an arc direction, and is pulled down in the left hand direction, and thereby the connection member 51a is released, and is brought face to face with the connection member 51b.

Figure 17D:
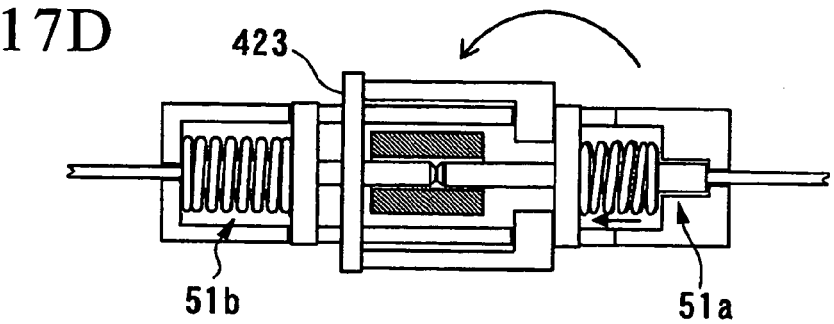

Then, the cam portion 413 of the fourth cam member 403 is removed from the cam member fixing groove 311 of the third adapter 301 (see FIG. 17D).

Figure 17E:
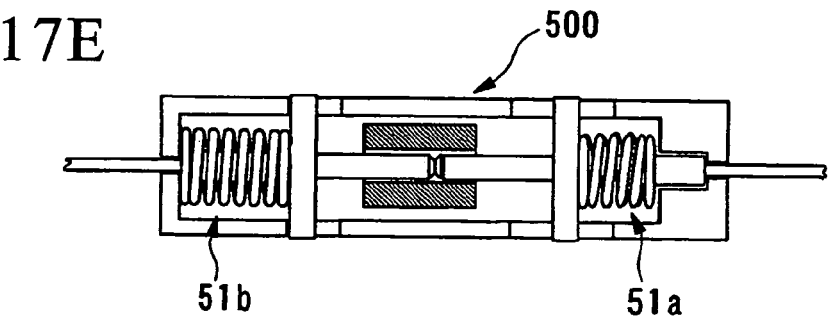

Then, the cam member is removed from the adapter, thereby the fifth optical connection structure 500 is formed (see FIG. 17E).

Thus, in the fifth optical connection structure 500, the fourth cam member 403 can be attached and detached from the third adapter 301.

Figure 18:
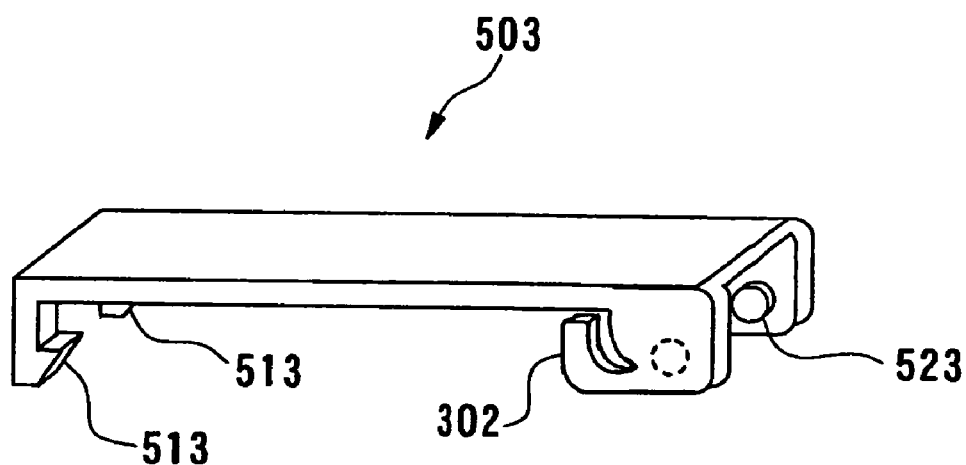
FIG. 18 is a perspective view showing a third example of the cam member constituting the optical connection structure of the present invention.

Moreover, as shown in FIG. 18, the flat spring 302 as the urging member may be provided to the fifth cam member 503, and in this case, the flat spring may be manufactured integrally with the cam member 503, or the member which is manufactured separately may be mounted to the cam member.

The fifth cam member 503 as shown in FIG. 18 is provided with a cam member rotation supporting shaft 523 and the flat spring 302 as the urging member at the side of the base end portion, further is provided with a cam member engaging portion 513 which engages with the adapter engaging portion 411 of the fourth adapter as mentioned later at the side of the front end portion.

Figure 19:
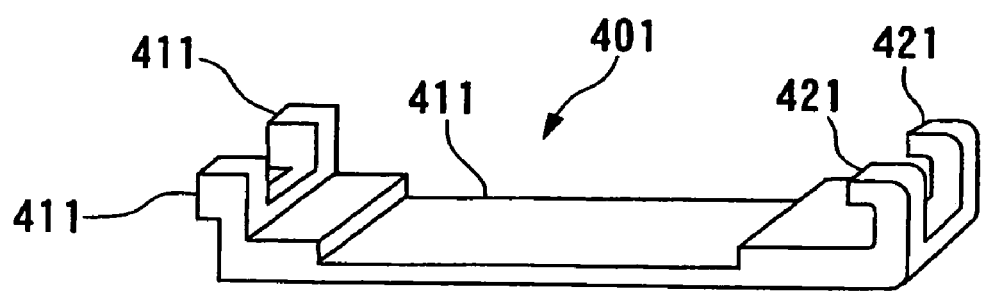
FIG. 19 is a perspective view showing a fourth example of the adapter constituting the optical connection structure of the present invention.

On the other hand, the fourth adapter 401 as shown in FIG. 19 is provided with the cam member rotation engaging portion 421 which engages with the cam member rotation supporting shaft 523 of the fifth cam member 503 as mentioned above at the side of the base end portion of the adapter body 411, while is provided with the adapter engaging portion 411 which engages with the cam member engaging portion 513 of the fifth cam member 503 as mentioned above at the side of the front end portion.

Figure 20A:
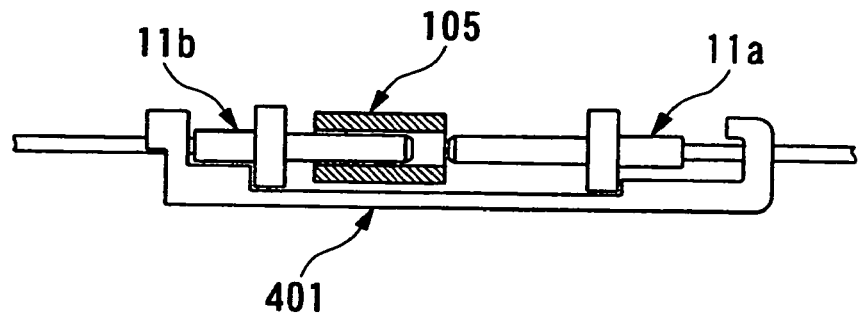
FIGS. 20A–20C are side views showing connection processes in the case of constituting a sixth optical connection structure of the present invention.
Figure 20B:
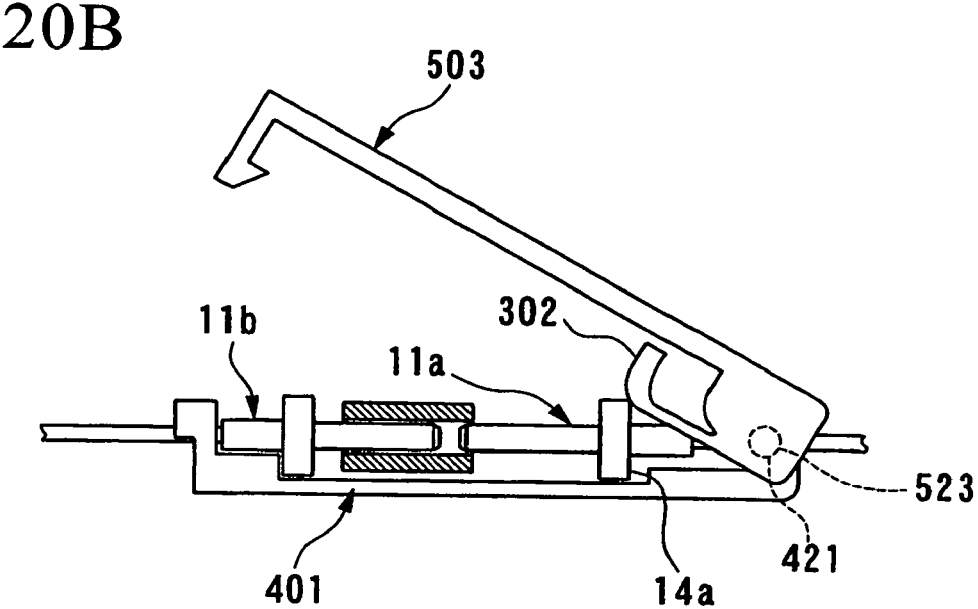
Figure 20C:
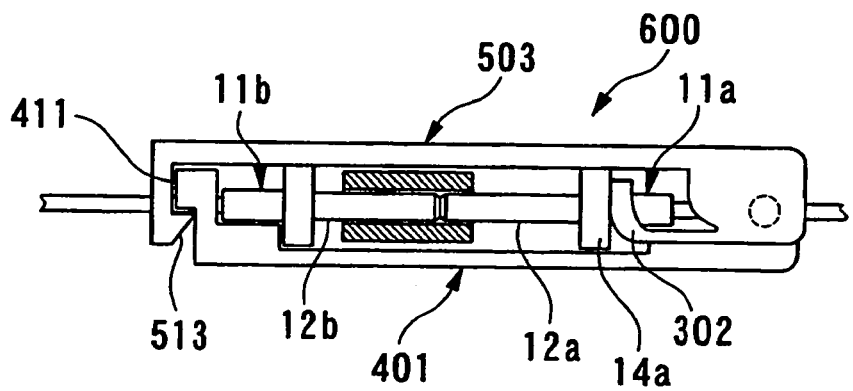

As a method for manufacturing the sixth optical connection structure 600 (FIG. 20C) according to the present embodiment using the cam member 503 and the adapter 401, first of all, as shown in FIG. 20A–FIG. 20C, the connection member 11a and 11b are mounted to the fourth adapter 401 as shown in FIG. 19 (see FIG. 20A).

Next, the cam member 503 as shown in FIG. 18 is mounted to the adapter 401, and the cam member 503 is pulled down, and thereby the connection member 11a is transported in the axial direction of the optical fiber by elastic power of the flat spring 302, and the end portion of the connection member 11a is inserted in the positioning member 105 (see FIG. 20B).

Furthermore, the cam member 503 is pulled down untill the adapter 401 is covered, and the cam member engaging portion 513 and the adapter engaging portion 411 are engaged with each other, and thereby the flat spring 302 as the urging member is deformed, the flange portion 14a of the connection member 11a is urged, and is brought face to face, and therefore, the optical connection structure 600 can be obtained (see FIG. 20C).

Moreover, for the reason that the urging member has the same effect as the case of the transportation member, the urging member may be provided to the adapter or the plug.

Moreover, the number of the parts may be decreased by unifying the urging member with the adapter or the plug.

Figure 21:
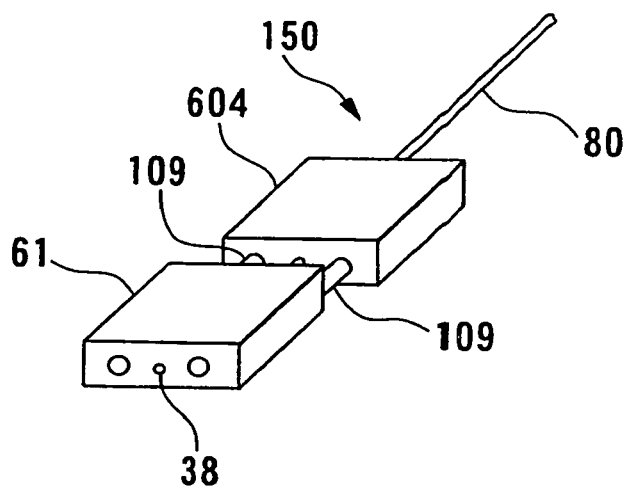
FIG. 21 is a perspective view showing an example of the plug constituting the optical connection structure of the present invention.

Moreover, as the method of manufacturing the seventh optical connection structure 700 (FIG. 22C) according to the present embodiment, first of all, as shown in FIG. 21, two plug fixing connection members 150 in which the connection member 61 in which the optical fiber 80 is inserted in the through hole 38 for the optical fiber thereof is mounted to the plug 604 via the guide pin 109 are prepared.

Figure 22A:
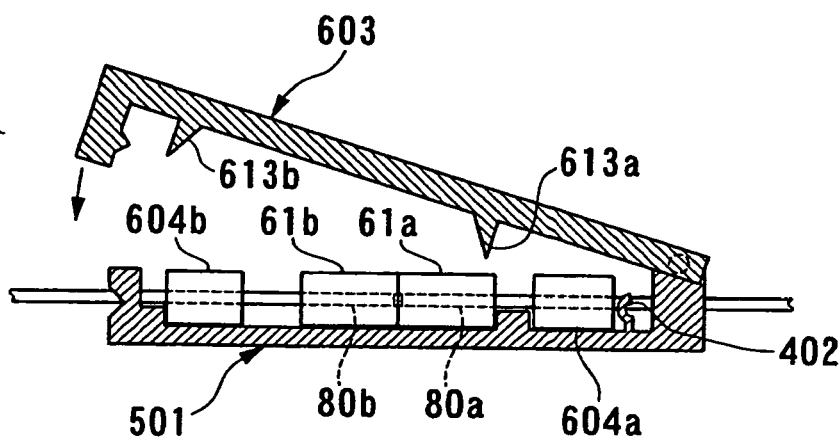
FIGS. 22A–22C are side views showing connection processes in the case of using the fifth example of the adapter and the fourth example of the cam member which constitute a seventh optical connection structure of the present invention.

Then, the fifth adapter 501 which is provided with the lever type of sixth cam member 603 as shown in FIG. 22A is mounted.

The fifth adapter 501 and the sixth cam member 603 are connected to each other at one side, and this is constructed so that the sixth cam member 603 covers the upper portion of the fifth adapter 501.

Moreover, the flat spring 402 as the urging member is integrally provided at the side of the connecting part with the sixth cam member 603 in the fifth adapter 501.

On the other hand, on the bottom surface of the sixth cam member 603 (that is, the surface opposed to the fifth adapter 501), two cam members 613a and 613b are integrally provided, respectively, at the sides of the connecting part with the fifth adapter 501 and at the side of the front end part.

The cam members 613a and 613b have the contact surfaces (the operating surfaces) which are inclined against the axial direction of the optical fiber, and these contact surfaces are opposed to each other.

The relative position of the plug 604a and the optical fiber 80a and the relative position of the plug 604b and the optical fiber 80b are fixed.

The plug 604a is maintained in the state of fixing position.

The plug 604b and the optical fiber 80b can be integrally transported in the axial direction of the optical fiber.

The connection member 61a and 61b can be transported.

The relative position of the connection member 61a and the optical fiber 80a, and the relative position of the connection member 61b and the optical fiber 80b can be changed.

Figure 22B:
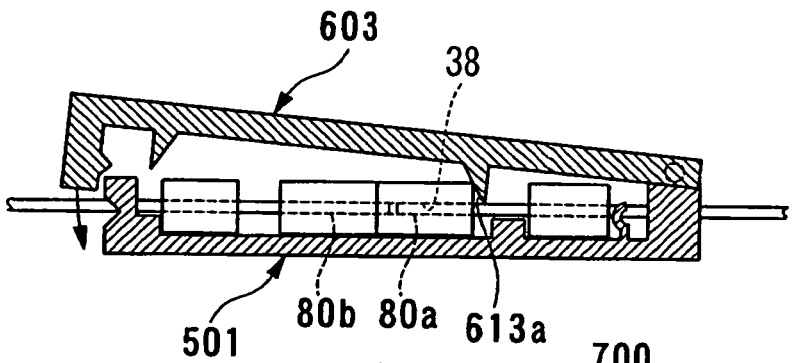
Figure 22C:
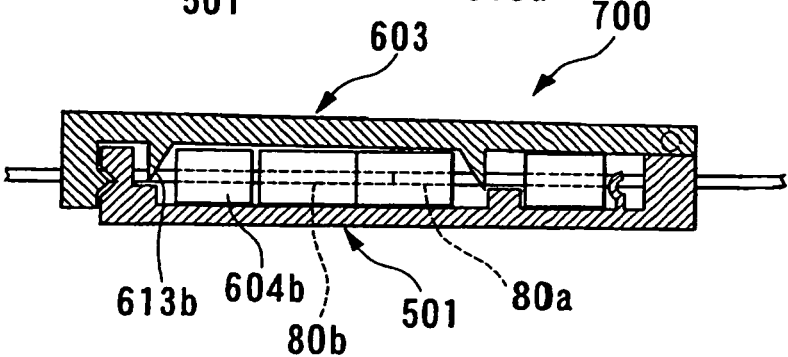

As the connection method in the optical connection structure 700 of the present embodiment as shown in FIG. 22A–FIG. 22C, first of all, the lever type of cam member 603 is released, and a pair of plugs 604a and 604b are mounted to the adapter 501 so that the respective connection member 61a and 61b are brought face to face with each other (see FIG. 22A).

Next, the cam member 603 is pulled down, and the contact surface (the operation surface) which is inclined against the central axis of the optical fiber of the cam member 613a is in contact with the connection member 61a, and thereby the connection member 61a is transported, while end portions of two optical fibers are aligned in the through hole 38, and thereby the end surfaces of a pair of optical fibers are connected (see FIG. 22B).

Furthermore, the cam member 603 is pulled down, the contact surface (the operation surface) which is inclined against the central axis of the optical fiber of the cam member 613b is in contact with the plug 604b, and thereby the plug 604b is transported, a pair of optical fibers 80a and 80b are brought face to face with each other, are urged from the cam members 613a and 613b, and are fixed in the state of being brought face to face. Thus, the optical connection structure 700 of the present embodiment can be obtained.

By this method, because two optical fibers are connected in one of the connection members, it is possible to have reliability even with mechanical or thermal changes. By using the optical connection structure and the optical connection method of the present embodiment, the connection member is transported, two optical fibers are inserted in one of the connection members, and further the process of bringing face to face can be conducted by only the process of pulling down the simple lever, and thereby reliability can be maintained, while the connection process can be simplified.

Figure 23A:
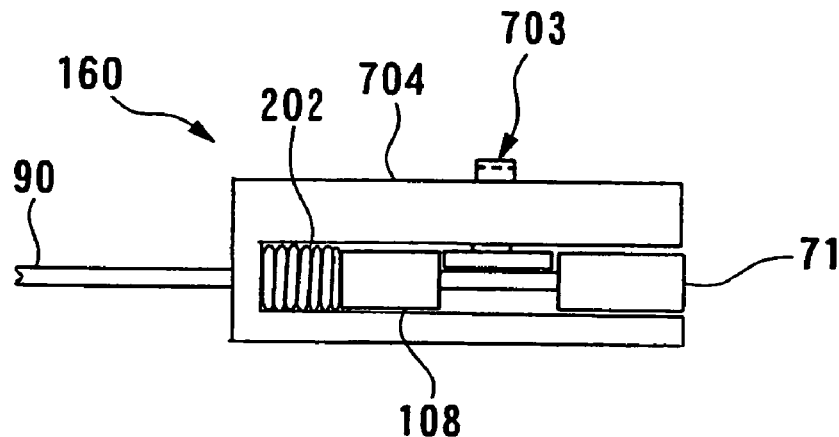
FIG. 23A and FIG. 23B are side views showing an example of the plug constituting the optical connection structure of the present invention.
Figure 23B:
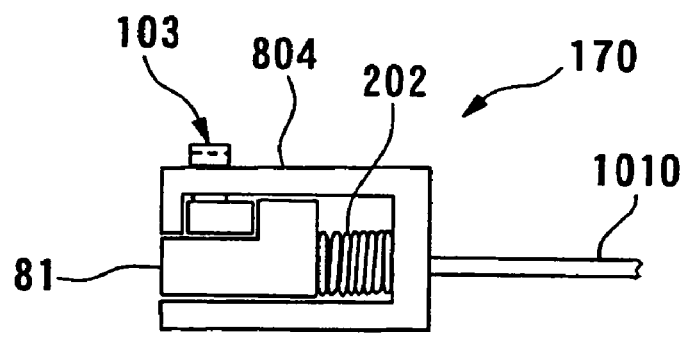

Moreover, as shown in FIG. 23A and FIG. 23B, two plugs which are provided with the different type of cam members and the different type of connection members, respectively, are prepared, and the optical connection structure in which these are in contacted with each other may be adopted.

FIG. 23A shows the sixth plug fixing connection member 160. In the sixth plug fixing connection member 160, the optical fiber fixing member 108 is fixed at the side of the base end portion of the connection member 71 in which the optical fiber 90 is mounted, and the spring 202 is mounted to the plug 704 at the side of the base end portion of the optical fiber fixing member 108.

Figure 24:
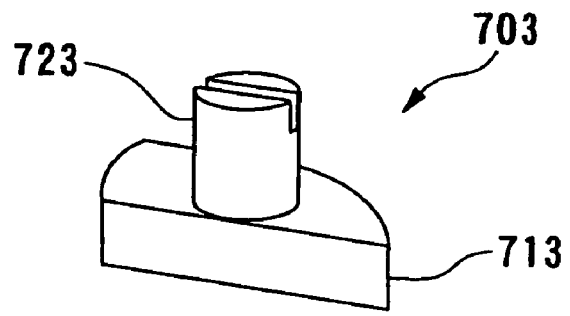
FIG. 24 is a perspective view showing a seventh example of the cam member constituting the optical connection structure of the present invention.

Moreover, in FIG. 23A, the seventh cam member 703 as the transportation member as shown in FIG. 24 is provided to the plug 704.

The seventh cam member 703 is provided with the cam portion 713 and the cam operation portion 723.

In addition, the cam member 703 in the present embodiment has an approximately knife shape.

The side surface of the cam member 713 of the cam member 703 has three surfaces which have different length in the width direction, and by rotating the cam member 703, the length in the axial direction of the optical fiber of the cam portion 713 becomes different.

Moreover, FIG. 23B shows the seventh plug fixing connection member 170, and the seventh plug fixing connection member 170 is mounted to the plug 804 via the spring 202 at the side of the base end portion of the connection member 81 in which the optical fiber 1010 is mounted.

Moreover, in FIG. 23B, the first cam member 103 as the transportation member as mentioned above is provided to the plug 804.

In addition, although the first cam member 103 mentioned above was used as the transportation member which is mounted to the plug 804 in the present embodiment, the second cam member 203, not the first cam member 103 mentioned above, may be used as the cam member of the present embodiment.

Figure 25A:
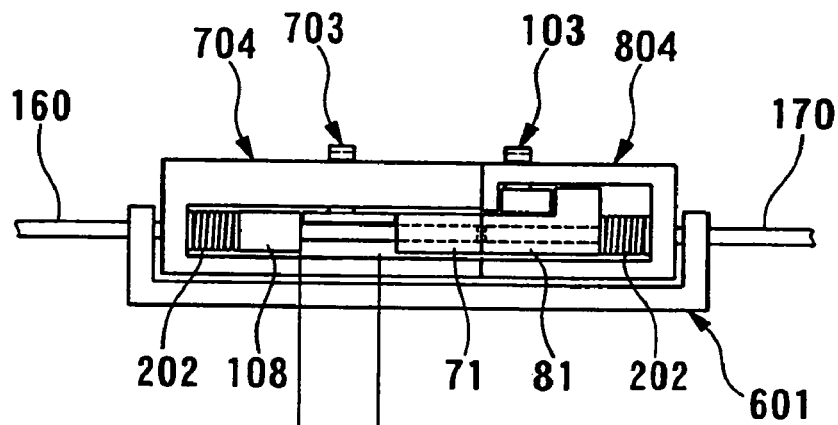
FIGS. 25A–25C are side views showing connection processes in the case of constituting an eighth optical connection structure, using the sixth example of the adapter constituting the optical connection structure of the present invention.
Figure 25B:
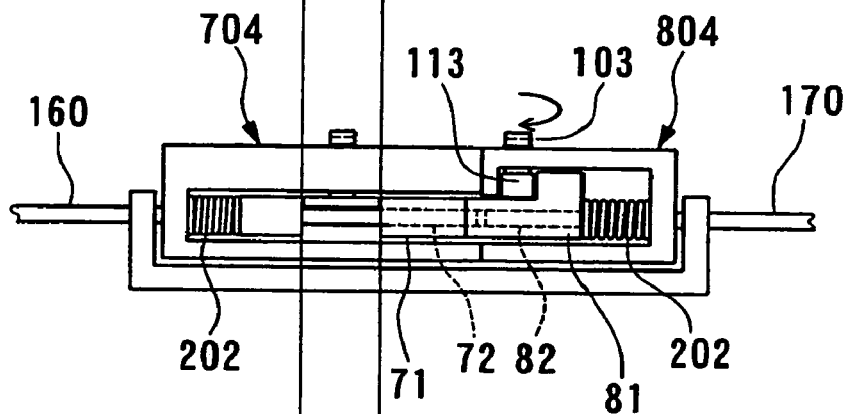
Figure 25C:
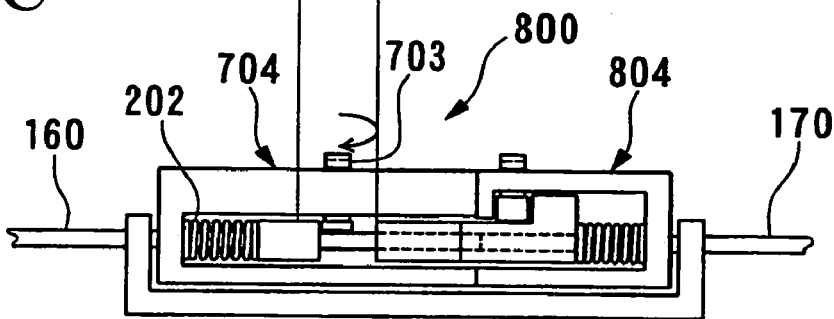

Furthermore, in the connection method according to the optical connection structure 800 of the present embodiment as shown in FIG. 25a–FIG. 25C, first of all, both the plugs 704 and 804 are mounted to the sixth adapter 601 (see FIG. 25A).

In this state, the longest cam portion in the cam member 703 is positioned in the axial direction of the optical fiber.

Next, according to the rotation of the cam member 103, the connection member 81 is released by the spring 202.

Thereby, the connection member 81 is transported toward the connection member 71 in the state in which the optical fiber 170 is fixed.

Furthermore, by rotating the cam member 703 clockwise, the second longer cam portion in the cam member 703 is positioned in the axial direction of the optical fiber.

Thereby, the connection member 71 is transported toward the connection member 81 by the urging force from the spring 202.

Thereby, the optical fibers 160 and 170 are positioned in the connection member 81 (see FIG. 25B).

Then, by rotating the cam member 703, the shortest cam portion in the cam member 703 is positioned in the axial direction of the optical fiber.

Thereby, the optical fiber fixing member 108 is released, the optical fiber fixing member 108 is transported by being urged by the spring 202, the optical fibers 160 and 170 are brought face to face with each other, and are fixed (see FIG. 25C).

Even if the rotary cam member 703 is fixed to the plug 704, a plurality of processes can be conducted at one time by providing a plurality of cam portions for the cam member, and the connection process can be simplified.

The positioning member for the connection member may be previously mounted to the above-mentioned connection member.

However, the positioning member is suitably selected and used depending on the kind of the connection member, the kind of the optical fiber, and a setting environment. In the case of positioning by using an external shape of the connection member, a glass tube, a plastic tube, a metallic conduit, or a ceramic pipe is used preferably.

Furthermore, the positioning member may be composed of some kinds of complex materials.

For example, the metallic conduit is arranged to the member which has a V shaped groove made of plastic or glass, and is fixed by the fixing member.

The number of the through holes which is provided to the positioning member is not especially limited as long as strength, positional accuracy, and hole shape of the positioning member can be maintained.

For example, a lot of through holes may be provided in a line, and thereby numerous connection members may be positioned at the same time, or the number of through holes greater than the number of the optical fibers may be provided for maintenance checking.

In addition, a shape of the through hole which is provided to the positioning member is suitably selected and used according to the shape of the connection member.

For example, in the case of connecting a pair of cylinder-shaped connection members, a cylinder-shaped, a trigonal prism-shaped, or a square prism-shaped through hole may be preferably used.

Moreover, a flat board may be arranged at the upper portion of the arranging member which have a V shaped groove, and may be used as the connection member which has a trigonal prism-shaped through hole.

In these through holes, it is desirable that an inside diameter thereof at the end surface of the through hole is the largest in order to facilitate the insertion of the connection member, and an inside diameter thereof in the vicinity of the central portion is the smallest.

For example, it may be used that the end surface of the through hole is chamfered, or is a shape of a cone.

Moreover, although the external shape of the positioning member is not especially limited, and the positioning member is suitably selected and used, a part of the circumference of the positioning member may be separated and used.

Therefore, it is possible for the connection member to be held stably.

Moreover, in the case in which a plurality of positioning members are used, a positioning member fixing member which fixes these positioning members together may be mounted to the connection member.

Moreover, the mounting method thereof is not especially limited.

Moreover, because the positioning member can be slid along the connection member, a transporting distance to the position at which the connection member can be positioned can be shortened, and thereby the sizes of the positioning member and the optical connection structure itself can be miniturized.

EXAMPLE

Hereinafter, although the invention is explained according to the examples, the present invention is not limited to the examples.

Example 1

As shown in FIG. 5, the optical fiber strand (a diameter thereof is 125 micrometer) is exposed by removing the coat in the vicinity of the end portion of the optical fiber core wire 40 (manufactured by FURUKAWA ELECTRIC CO., LTD., a diameter thereof is 250 micrometer), then is inserted in a zirconia ferrule (the connection member) (manufactured by Seiko Instruments Inc., an outside diameter of the ferrule is 1.25 mm) 11 for MU connector, is fixed, and is rasped. Furtermore, two members manufactured by this method are prepared.

Next, one ferrule 11 and the spring 202 as shown in FIG. 5 are mounted to the first plug 204 which is manufactured using ABS resin as shown in FIG. 6, and thereby the first plug fixing connection member 101 is formed.

Similarly, another ferrule 21, the cam member 203 as shown in FIG. 7A, and the spring 202 are mounted to the second plug 204 which is manufactured using ABS resin, and thereby the second plug fixing connection member 201 is formed.

Moreover, a metal cut sleeve 105 (FIG. 6) (manufactured by SANWA DENKI KOGYO Co., Ltd., made from phosphor bronze) as the positioning member is mounted to the front end portion 12 of the ferrule 11.

Next, as shown in FIG. 8, the second adapter 201 according to the present embodiment which mounts two plugs as mentioned above is manufactured using ABS resin.

Then, as shown in FIG. 9A and FIG. 9B, the first plug 204 and the second plug 304 are mounted to the adapter 201.

By rotating the cam member 203 of the second plug 304 at 180 degree using a precision minus type of screw driver, the flange member 24 of another ferrule 21 is urged by the cam member 213, the front end portion 22 of another ferrule 21 is transported at the side of one ferrule 11, and the front end portion 12 and 22 of the ferrules 11 and 21 are positioned, and thereby the second optical fiber connection structure 200 according to the present embodiment is manufactured.

The manufactured optical connection parts allow easy conduction of the connection operation from the perpendicular direction against the central axis of the optical fiber, different from the method for attaching and detaching by push-pull, by using the cam, and thereby a connecting workability on the substrate which has the small operation space can be improved.

Moreover, in the case of using the cam, the attachment and the detachment can be conducted stably, and it is prevented that the optical fiber is damaged, as compared with the push-pull attachment and detachment system in which the attachment and detachment direction is not stabilized because it is performed by hand, the optical fiber connection parts are in contact with the surrounding parts by the reaction, and break them.

Furthermore, because a rotary power which is parallel to the substrate is added, the urging force in the perpendicular direction against the substrate is not operated, and thereby the substrate is not damaged at all.

Moreover, as compared with the optical fiber in which a latch mechanism is complicatedly combined, the structure for transporting the connection member such as the ferrule and the like becomes simple, and thereby the number of the parts decreases, and the design of the optical connector becomes easy.

Regarding the second optical fiber connection structure 200 which is manufactured, a connection loss in a connection point of the optical fiber is measured by the following method.

A light intensity measuring instrument (Light wave multimeter 8163A, manufactured by Agilent Technologies Ltd.) is connected to one optical fiber core wire 40 via FC type connector.

Furthermore, light intensity is measured of a light signal for measurement which enters from another optical fiber core wire 40, passes the connection point, and is emitted from one optical fiber core wire 40.

Furthermore, the connection loss is searched by measurement values of the light intensity of the light signal for measurement before entering and the light intensity of the light signal for measurement after emitting, the connection loss of the FC type connector is deducted, and thereby the connection loss on the connection point of the optical fiber is obtained.

As a result, the connection loss is an average of 0.2 dB or less, and it is fully possible to use this as an optical connection structure.

Example 2

As in Example 1, as shown in FIG. 14, the optical fiber 70 is inserted in a zirconia ferrule (the connection member) 51 for MU connector, is fixed, and is rasped. Furthermore, two members manufactured by this method are prepared.

Next, one spring 202 is mounted to one ferrule 51a.

Moreover, a metal cut sleeve 105 (manufactured by SANWA DENKI KOGYO Co., Ltd., made from phosphor bronze) as the positioning member is mounted to another ferrule 51b.

As shown in FIG. 15, the third adapter 301 according to the present embodiment so as to mount the ferrules 51a and 51b is manufactured. Furthermore, as shown in FIG. 16, the fourth cam member 403 according to the present embodiment to which the arm (the operation portion 423) is provided is manufactured.

Next, as shown in FIG. 17A, a ferrule 51a with a spring is mounted to the adapter 301.

Then, the cam member 403 is mounted to the adapter 301, and the arm is pulled down at the right side, and thereby the cam member 413 urges the flange member of the ferrule, and thereby the ferrule 51a is transported toward the right side, shortening the spring (see FIG. 17B).

Then, another ferrule 51b is mounted to the adapter 301 (see FIG. 17C), by pulling down the cam member 403 at the left side (see FIG. 17D), the ferrule 51a is released from the cam member 413 and is transported at the left side, and then the front end portion 52a of the ferrule is inserted in the cut sleeve 105, a pair of ferrules are positioned, and thereby a pair of ferrules can be brought face to face with each other.

Then, the cam member 403 is removed from the plug 301, and thereby the fifth optical fiber connection structure 500 according to the present embodiment can be obtained (see FIG. 17E).

The optical connection parts which is manufactured has the same excellent effect as described regarding the optical connection structure according to Example 2.

Moreover, in the case of this optical connection structure, when the connection process is conducted, the cam member is needed, in the following stationary state, the cam member can be removed, and thereby it is prevented that the component parts are in contact with the cam member carelessly and are damaged, and furthermore, it is prevented that the attaching and detaching operation are conducted accidentally.

Then, as in Example 1, when the connection loss is measured at the connection point, the connection loss is an average of 0.2 dB or less, and it is fully possible to use as the optical connection structure.

Example 3

As in Example 1, the optical fiber 40 is inserted in a zirconia ferrule (the connection member) 51 for MU connector, is fixed, and is rasped. Furthermore, two members manufactured by this method are prepared (see FIG. 10).

Next, the fifth cam member 503 according to the present embodiment as shown in FIG. 18 which is manufactured using ABS resin is mounted to the fourth adapter 401 according to the present embodiment as shown in FIG. 19 which is manufactured using the stainless steel plate.

Moreover, as shown in FIGS. 20A–20C, one metal cut sleeve 105 (manufactured by SANWA DENKI KOGYO Co., Ltd., made from phosphor bronze) as the positioning member is mounted to one ferrule as mentioned above.

Then, two ferrules 11a and 11b as mentioned above are mounted to the adapter 401, the cam member rotation supporting shaft 523 of the cam member 503 is engaged with the supporting shaft engaging portion 421 of the adapter 401, and thereby the cam member 503 is mounted to the adapter 401.

Next, by pulling down the cam member 503 at the side of the adapter 401, and rotating the cam member 503, the flange portion 14a of the ferrule 11a is urged by the cam member 503, the ferrule 11a is transported, the front end portion 12a of the ferrule is inserted in the metal cut sleeve 105, and thereby a pair of ferrules is positioned, while the urging force is added by the flat spring 302 which is united with the cam member, a pair of ferrules are brought face to face with each other, and thereby the sixth optical fiber connection structure 600 according to the present embodiment is manufactured.

The optical connection parts which are manufactured have the same excellent effect as described regarding the optical connection structure according to Example 2.

Moreover, in the case of this optical connection structure, the cam member fixes the adapter, the ferrule, and the sleeve fixing member, and further the spring as the urging member which is necessary in Example 2 is removed, and the cam member and the urging member are unified by the flat spring, and it is thereby possible to obtain a structure which can stably fix the ferrule as the connection member by using a minimum number of parts.

Therefore, an assembly process also becomes easier.

Then, as in Example 1, when the connection loss is measured at the connection point, the connection loss is an average of 0.2 dB or less, and it is fully possible to use as the optical connection structure.

Example 4

As in Example 1, the optical fiber is inserted in a zirconia ferrule (the connection member) for MU connector, is fixed, and is rasped. Furthermore, two members manufactured by this method are prepared.

Figure 26:
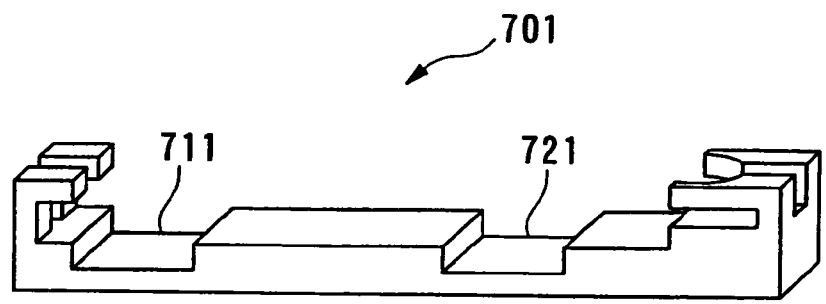
FIG. 26 is a perspective view showing a seventh example of the adapter constituting the optical connection structure of the present invention.

Next, the second cam member 203 according to the present embodiment as shown in FIG. 7A which is manufactured using ABS resin is mounted to the seventh adapter 701 according to the present embodiment as shown in FIG. 26 which is manufactured using the ABS resin.

Moreover, the spring 202 and the metal cut sleeve 105 (manufactured by SANWA DENKI KOGYO Co., Ltd., made from phosphor bronze) as the positioning member are mounted to one ferrule as mentioned above.

Figure 27A:
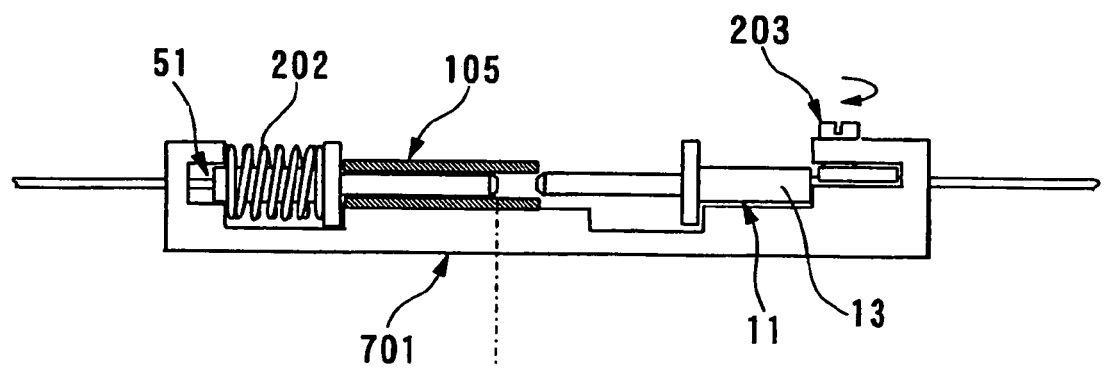
FIG. 27A and FIG. 27B are side views showing connection processes in the case of constituting a ninth optical connection structure of the present invention.
Figure 27B:
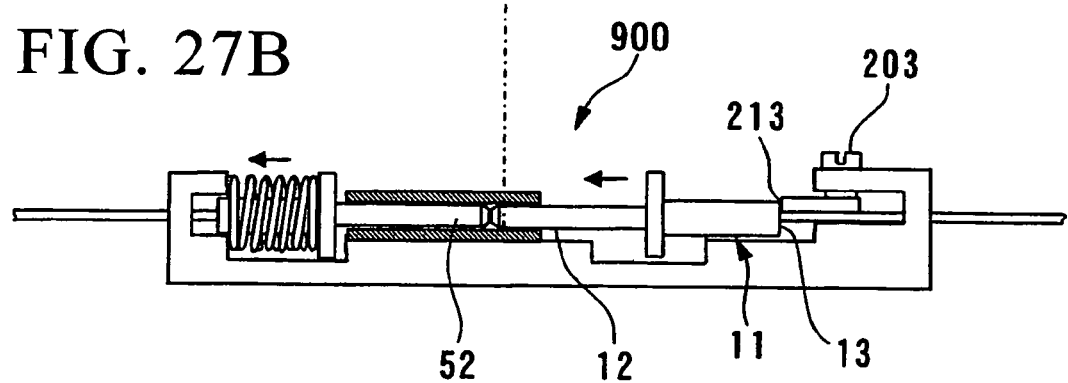

Then, as shown in FIG. 27A and FIG. 27B, by mounting two ferrules 11 and 51 to the adapter, rotating them 90-degrees using the precision minus type of screw driver, and rotating the cam member, the base end portion 13 of the ferrule 11 is urged by the cam member 203, the ferrule 11 is transported, the front end portion of the ferrule is inserted in the metal cut sleeve 105, and thereby a pair of ferrules are positioned with each other, while the spring 202 which is provided to another ferrule 51 urges, a pair of ferrules are brought face to face with each other, and thereby the ninth optical fiber connection structure 900 according to the present embodiment is manufactured.

The optical connection parts which are manufactured has the same excellent effect as described regarding the optical connection structure according to Example 1.

Moreover, in the case of this optical connection structure, because the cam member is attached to the adapter, the plug for attaching the cam member is not necessary, and the ferrule is only mounted to the adapter, and thereby the number of the component parts can be decreased further, and the assembly process becomes easy.

Then, as in Example 1, when the connection loss is measured at the connection point, the connection loss is an average of 0.2 dB or less, and it is fully possible to use as the optical connection structure.

Example 5

Figure 28:
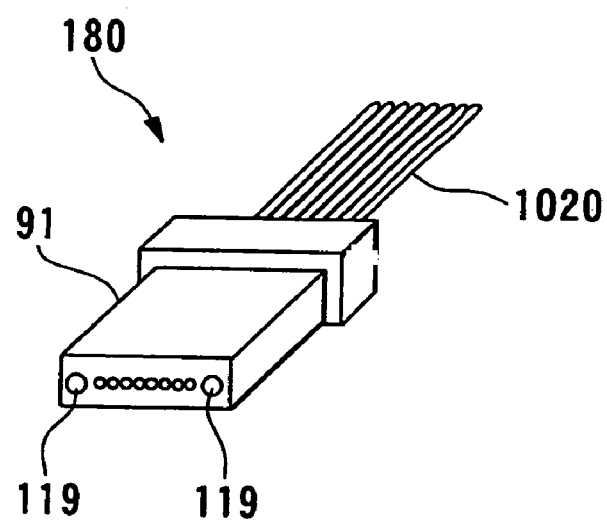
FIG. 28 is a view showing a MT ferrule constituting the optical connection structure in the present embodiment.

As shown in FIG. 28, the optical fiber strand (a diameter thereof is 125 micrometer) is exposed by removing the coating in the vicinity of the end portion of the eight core optical fiber tape core wire 1020 (manufactured by Hakusan Mfg. Co, Ltd., 250 micrometer diameter optical fiber is used), and is inserted in a MT ferrule (the connection member) 91 (manufactured by Hakusan Mfg. Co, Ltd., and is used for single mode), is fixed, and is rasped. Thereby, two plugs 180 are manufactured.

Figure 29:
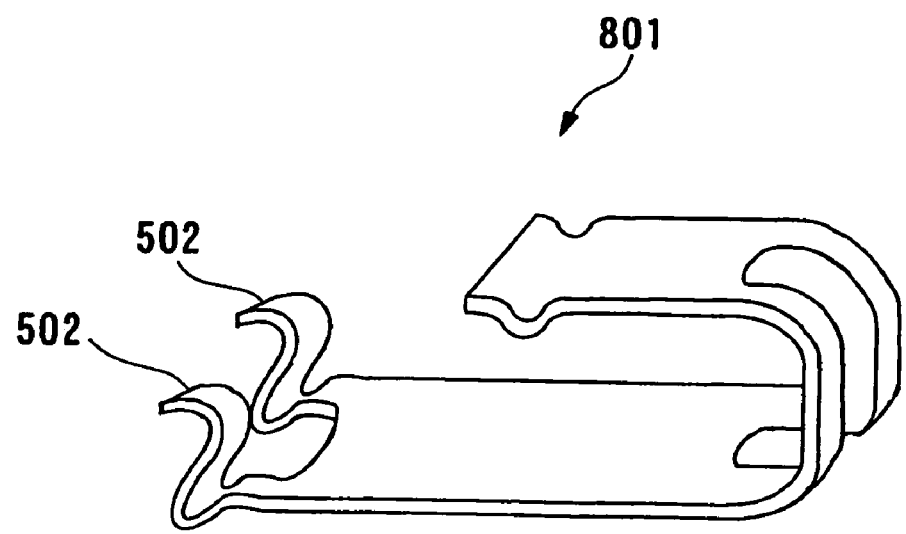
FIG. 29 is a perspective view showing an eighth example of the adapter constituting the optical connection structure of the present invention.

As the other embodiment of the fifth cam member 503 according to the present embodiment, by processing the stainless steel plate as shown in FIG. 29, the eighth adapter 801 according to the present embodiment is manufactured, molding integrally.

One plug 180a is fixed to the eighth adapter 801 via the spring 202, the pressing plate 106, and the guide pin 109 (see FIG. 30).

Figure 30A:
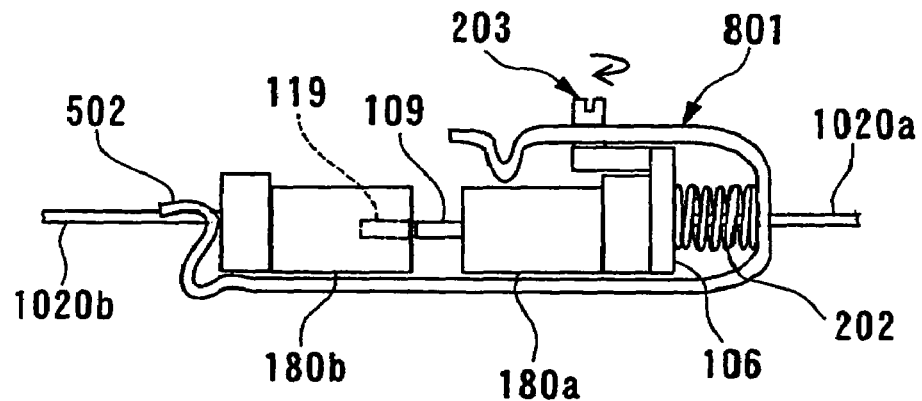
FIG. 30A and FIG. 30B are side views showing connection process in the case of constituting a tenth optical connection structure of the present invention.

Next, another plug 180b is mounted to the adapter 801 as shown in FIG. 30A.

Then, by rotating the cam member 203 90-degrees using the precision minus type of screw driver, the plug 180a is released by the spring 202, and is transported toward another plug 180b by urging due to the spring 202, and thereby the plug 180a is positioned by the guide pin 109, and is brought face to face with another plug 180b.

Figure 30B:
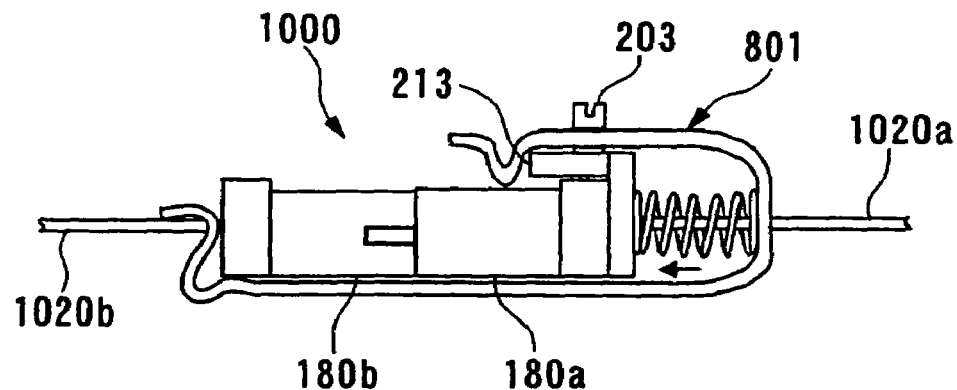

As mentioned above, the tenth optical fiber connection structure 1000 according to the present embodiment is manufactured (see FIG. 30B).

The optical connection parts which is manufactured has the same excellent effect as described regarding the optical connection structure according to Example 2.

In the case of this optical connection structure, because the urging force does not work on the cam portion, and stress is never applied to the cam in the state of connection, the life of the cam portion increases, and furthermore the parts can be miniaturized.

Moreover, in an ordinary MT clip, in the case in which the clip is fixed to the substrate, and MT ferrule is mounted, after MT ferrules are brought face to face via the guide pin in advance, MT ferrules are mounted to MT clips, and in this case, there is a possibility that the substrate will be urged from the upper portion excessively. In the case of the present optical connection structure, because the urging force is not applied to the substrate from the upper portion, the substrate is not damaged.

Then, as in Example 1, when the connection loss is measured at the connection point, the connection loss is an average of 0.5 dB or less, and it is fully possible to use as the optical connection structure.

Example 6

Figure 31:
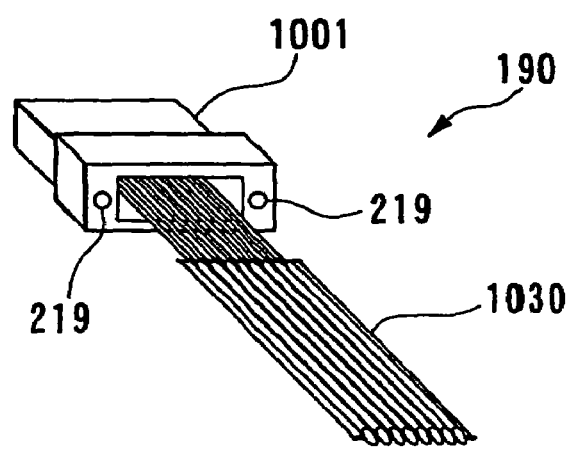
FIG. 31 is a view showing another MT ferrule constituting the optical connection structure in the present embodiment.

As shown in FIG. 31, the optical fiber strand (a diameter thereof is 125 micrometer) is exposed by removing the coating in the vicinity of the end portion of the eight core optical fiber tape core wire 1030 (manufactured by Hakusan Mfg. Co, Ltd., 250 micrometer diameter optical fiber is used), and the optical fiber strand is cut at a point 10 mm from the end portion of the coating.

Two plugs 190 are manufactured by inserting this optical fiber strand into a MT ferrule (the connection member) 101 (manufactured by Hakusan Mfg. Co, Ltd., and are used for single mode).

Figure 32:
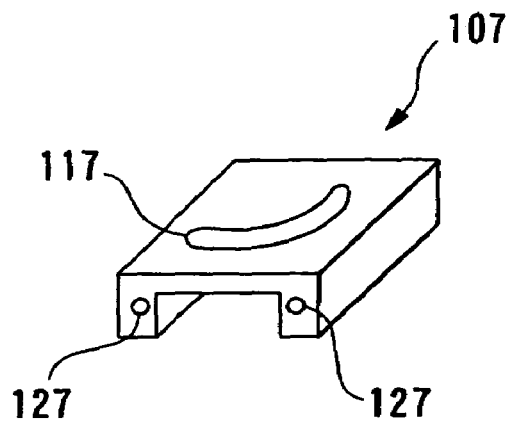
FIG. 32 is a view showing a guide pin fixing member constituting the optical connection structure in the present embodiment.
Figure 33:
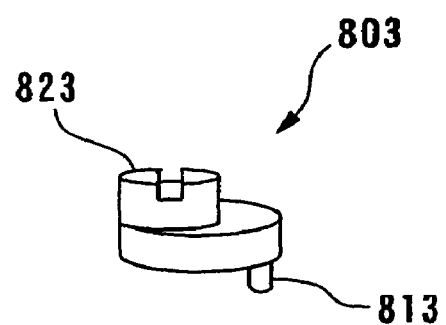
FIG. 33 is a perspective view showing an eighth example of the cam member constituting the optical connection structure of the present invention.

Next, the guide pin fixing member 107 which has the cam inserting groove 117 at the upper portion as shown in FIG. 32, and the eighth cam member 803 according to the present embodiment as shown in FIG. 33 are prepared.

Figure 34:
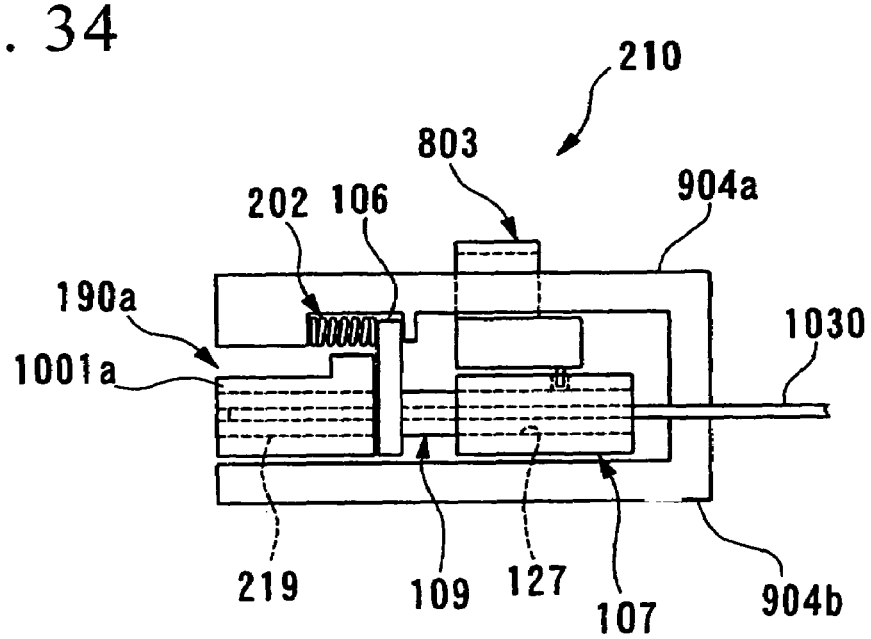
FIG. 34 is a view showing a plug constituting the optical connection structure in the present embodiment.

As shown in FIG. 34, the guide pin 109 is fixed to the guide pin insertion hole 127 of the guide pin fixing member 107, the guide pin 109 is inserted in the guide pin insertion hole 219 of MT ferrule 1001a of one plug 190a as mentioned above, is attached, and is installed in the first plug upper part 904a manufactured using ABS resin via the spring 202 and the eighth cam member 803 according to the present embodiment as shown in FIG. 33.

Then, the first plug bottom part 904b is attached, and thereby the first plug fixing connection member 210 is manufactured as shown in FIG. 34.

Here, the optical fiber tape core wire 1030 is fixed so as to be put between the first plug upper part 904a and the first plug bottom part 904b.

Moreover, the eighth cam member 803 is provided with the cam operation portion 823, and the pin shape of cam portion 813 which is projected toward an underpart, and is inserted in the cam insertion groove 117 provided at the upper surface of the guide pin fixing member 107 as mentioned above.

Figure 35:
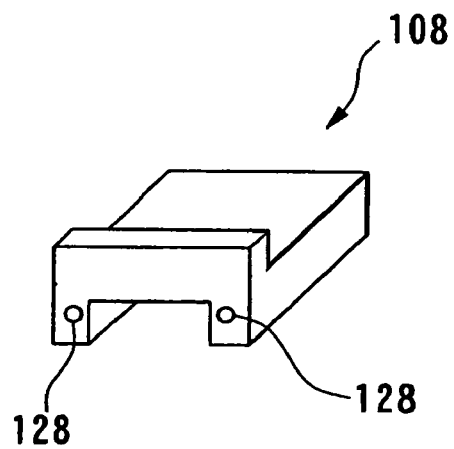
FIG. 35 is a view showing an optical fiber fixing member constituting the optical connection structure in the present embodiment.
Figure 36:
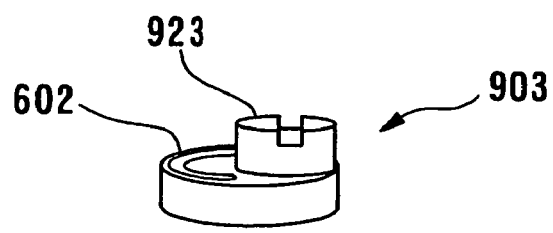
FIG. 36 is a perspective view showing a ninth example of the cam member constituting the optical connection structure of the present invention.

Moreover, the ninth cam member 903 according to the present embodiment which is integrally provided with the optical fiber fixing member 108 as shown in FIG. 35, and the flat spring 602 having the spring structure as shown in FIG. 36 is prepared.

Figure 37:
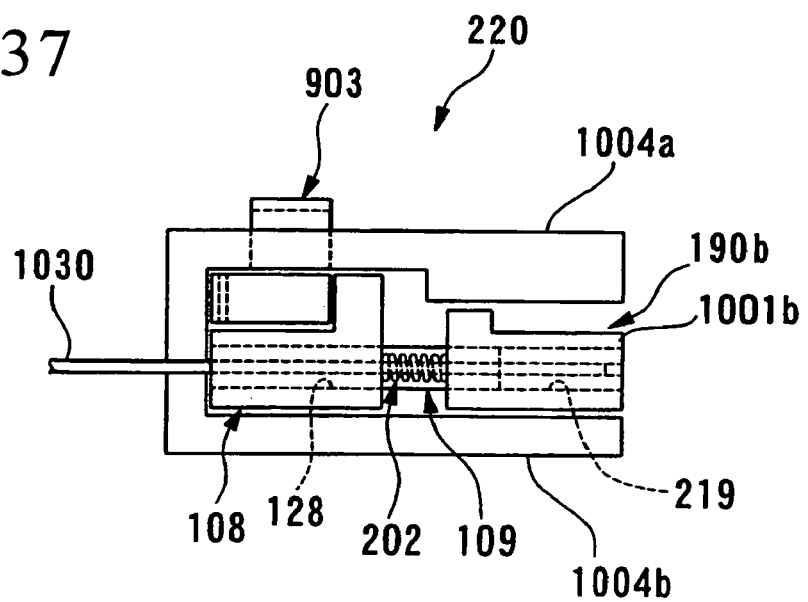
FIG. 37 is a view showing a plug constituting the optical connection structure in the present embodiment.

As shown in FIG. 37, the guide pin 109 is fixed to the guide pin insertion hole 128 of the guide pin fixing member 108, and the guide pin 109 is inserted in the guide pin insertion hole 219 of MT ferrule 1001b of another plug 190b via the spring 202, and is attached.

Moreover, the ninth cam member 903 and the second plug bottom part 1004b as shown in FIG. 36 is attached to the second plug upper part 1004a manufactured using ABS resin, and thereby the second plug fixing connection member 220 as shown in FIG. 37 is manufactured.

Here, the optical fiber tape core wire is fixed in the groove of the optical fiber fixing member with epoxy adhesive.

Moreover, the sixth adapter 601 according to the present embodiment is manufactured using ABS resin.

Figure 38A:
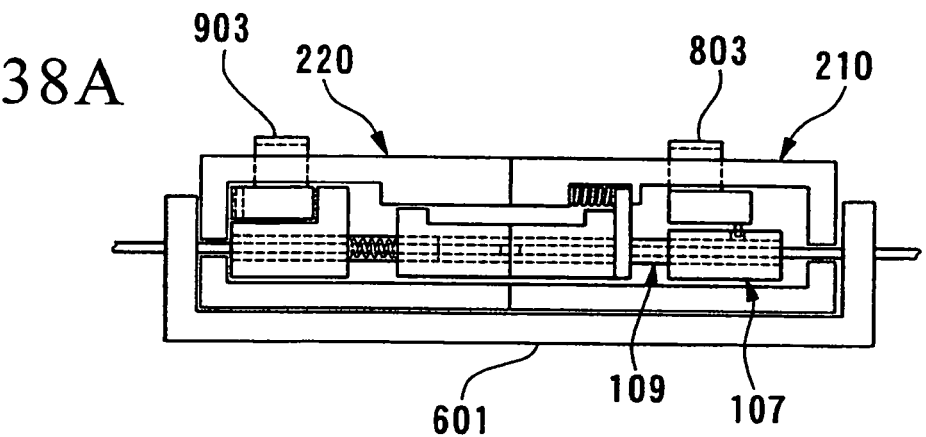
FIGS. 38A–38D are side views showing connection process in the case of constituting an eleventh optical connection structure of the present invention.
Figure 38B:
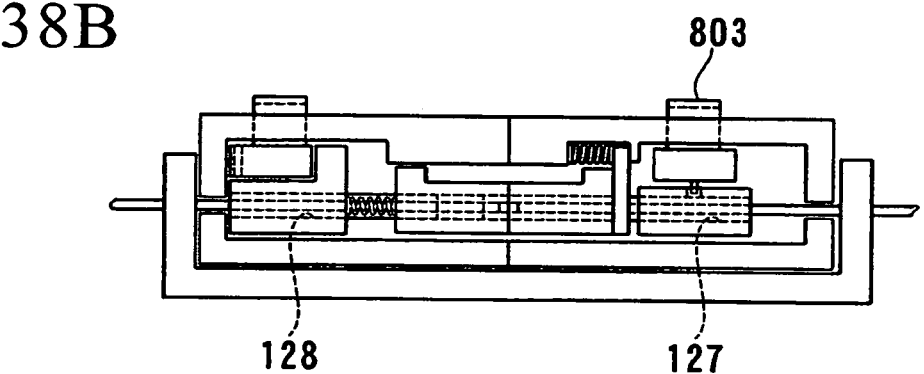

Furthermore, the first plug fixing connection member 210 and the second plug fixing connection member 220 are mounted to the sixth adapter 601 according to the present embodiment as shown in FIG. 38A–FIG. 38B (see FIG. 38A).

Next, the eighth cam member 803 according to the present embodiment is rotated 90-degrees, and thereby the guide pin 109 of the first plug fixing connection member 210 is inserted in the guide pin hole 127 of the second plug fixing connection member 220 (see FIG. 38B).

Figure 38C:
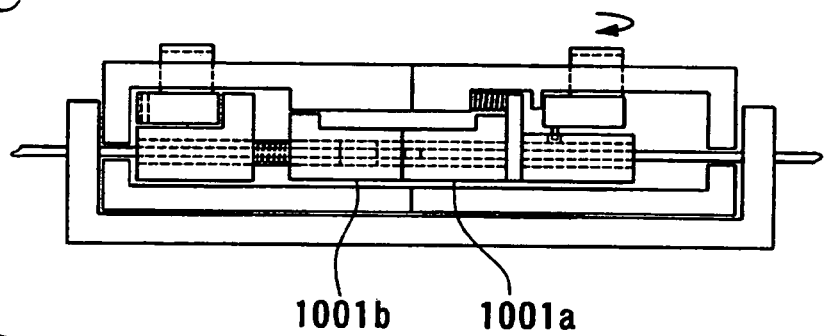

Furthermore, by rotating the cam member 803 90-degrees, MT ferrule 1001a is urged by the guide pin fixing member 107, MT ferrule 1001a slides, and the optical fibers of both plugs are positioned within MT ferrule of the first plug (see FIG. 38C).

Moreover, because the transportation route of the cam portion 813 of the cam member 803 differs from the shape of the cam insertion groove 177 of the guide pin fixing member 107, the cam portion 813 is engaged with an outside edge portion of the cam insertion groove 177 according to the rotation of the cam member 803, and thereby the guide pin fixing member 107 is transported toward the second plug fixing connection member 220.

Figure 38D:
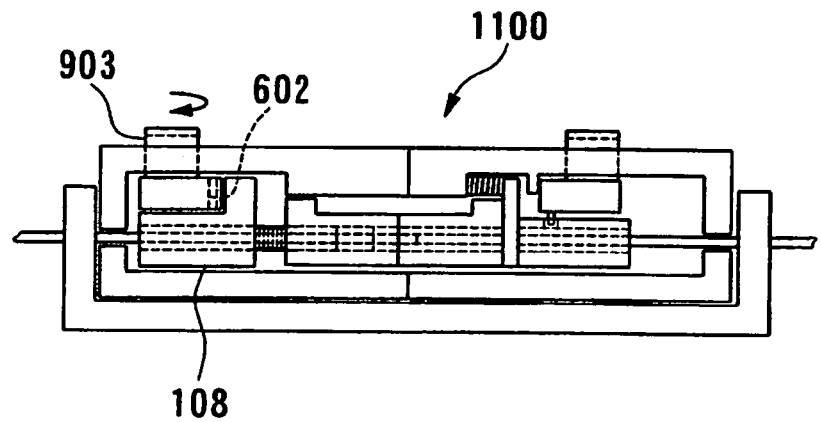

Then, by rotating at 180-degrees the ninth cam member 903 according to the present embodiment of the second plug fixing connection member 220, the optical fiber fixing member 108 is urged by elastic repulsive power of the flat spring which has a spring structure unified with the second cam member, and a pair of optical fibers are brought face to face with each other by the urging force between the optical fibers, and thereby the eleventh optical fiber connection structure 1100 according to the present embodiment is manufactured (see FIG. 38D).

The optical connection parts which is manufactured make it easy to conduct the connection operation from the perpendicular direction against the central axis of the optical fiber, different from the method for attaching and detaching by push-pull, by using the cam, and thereby a connecting workability on the substrate which has the small operation space can be improved.

Moreover, the attachment and the detachment can be conducted stably, and it is prevented that the optical fiber is damaged, as compared with the push-pull attachment and detachment system in which the attachment and detachment direction is not stabilized, the optical fiber connection parts are in contact with the surrounding parts by the reaction, and break them.

Moreover, because a rotary force which is parallel to the substrate is added, the urging force in the perpendicular direction against the substrate does not work, and thereby the substrate is not damaged at all.

Furthermore, because the cam is used, some performances that include bringing face to face the optical fibers, fixing the optical connector, and the like can be conducted by a single operation, and thereby the connection process of the optical fiber can be simplified. Furthermore, because the guide pin can be held inside, there is no projection, and thereby the plug can be mounted to the adapter at right angles in the state that the optical fiber is perfectly held in MT ferrule as the connection member. Therefore, a possibility that the optical fiber is damaged by the contact of the guide pin and the optical fiber, or the connection member and the optical fiber does not exist.

As compared with the optical connector in which a latch mechanism is complicatedly combined, the structure becomes simple, and thereby the design of the connector becomes easy.

Moreover, because the number of the parts decreases, the cam is operated in the different direction from the direction for attaching and detaching the optical connector, the connection operation from the perpendicular direction to the central axis of the optical fiber can be conducted easily, and thereby a connecting workability from the upper surface of the substrate is improved.

Then, in Example 1, when the connection loss is measured at the connection point, the connection loss is an average of 0.5 dB or less, and it is fully possible to use as the optical connection structure.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An optical connection structure comprising:
   a pair of connection members which hold optical fibers and are arranged at a position face to face with each other;
   an adapter which mounts the connection members, wherein the adapter receives the connection members in a direction substantially perpendicular to a direction along which the connection members face each other;
   a transportation member which transports one of the connection members in the state of holding one of the optical fibers at its axial direction; and
   a plug which mounts the one of the connection members, wherein the transportation member is attached to the plug.

2. The optical connection structure according to claim 1, further comprising:
   an urging member which urges the one of the optical fibers in its axial direction in a state that the pair of optical fibers which are held respectively by the pair of connection members are brought face to face with each other.

3. The optical connection structure according to claim 1, wherein one of the connection members slides against one of the optical fibers.

4. The optical connection structure according to claim 1, wherein the one of the connection members is slidably mounted to the plug.

5. The optical connection structure according to claim 2, wherein the urging member is attached to the plug.

6. The optical connection structure according to claim 2, wherein the urging member is attached to the adapter.

7. The optical connection structure according to claim 1, wherein the transportation member has an attachable and detachable structure.

8. The optical connection structure according to claim 2, wherein the urging member is attached to the transportation member.

9. The optical connection structure according to claim 2, wherein the urging member has a spring structure.

10. The optical connection structure according to claim 2, wherein the urging member is attached to the transportation member and has a spring structure.

11. The optical connection structure according to claim 1, wherein the optical fibers are brought face to face with each other within one of the pair of connection members.

12. The optical connection structure according to claim 1, further comprising: a positioning member which aligns relative position between the connection members.

13. The optical connection structure according to claim 12, wherein the positioning member is attached to the adapter.

14. The optical connection structure according to claim 1, wherein the transportation member is a singular cam member or a plurality of cam members.

15. The optical connection structure according to claim 1, wherein one of the connection members is mounted to the adapter from an opening direction of the adapter.

16. The optical connection structure according to claim 1, wherein the transportation member has a contacting surface with the one of the connection members used for a transportation of the one of the connection members, and the contacting surface is inclined against the axial direction of the one of the optical fibers.

17. The optical connection structure according to claim 1, wherein the transportation member has a structure which enables to conduct a rotary operation with a vertical axis against the axial direction of the one of the optical fibers.

18. The optical connection structure according to claim 14, wherein the transportation member has a cam portion which is arranged contacting with the one of the connection members, and the cam portion is conducted with eccentric transportation by rotary operation.

19. The optical connection structure according to claim 14, wherein the transportation member has a force transfer portion and an operation portion in which rotary operation is conducted, wherein the force transfer portion is transported in the axial direction of the one of the optical fibers by the rotary operation of the operation portion.

20. An optical connection method using the optical connection structure according to claim 1, wherein the connection member in a state of holding the one of the optical fibers is transported in the axial direction of the one of the optical fibers by conducting rotary operation of the transportation member which has a structure capable of rotary operation with a vertical axis against the axial direction of the one of the optical fibers.

21. The optical connection method according to claim 20, wherein a force transfer portion of the transportation member which is arranged contacting with the one of the connection members conducts eccentric transportation by rotary operation of an operation portion of the transportation member.

22. The optical connection method according to claim 20, wherein a force transfer portion of the transportation member is transported in the axial direction of the one of the optical fibers by rotary operation of an operation portion of the transportation member.

23. The optical connection structure according to claim 1, wherein an urging force toward a side of a base end portion of the one of the connection members is bound by the transportation member.

* * * * *